US011488076B2

(12) United States Patent
Walet et al.

(10) Patent No.: US 11,488,076 B2
(45) Date of Patent: Nov. 1, 2022

(54) ASSIGNING WAREHOUSE RESOURCES TO AN INBOUND TRUCK TO MAXIMIZE WAREHOUSE THROUGHPUT

(71) Applicant: Lineage Logistics, LLC, Irvine, CA (US)

(72) Inventors: Daniel Walet, Oakland, CA (US); Daniel Thomas Wintz, San Francisco, CA (US)

(73) Assignee: Lineage Logistics, LLC, Irvine, CA (US)

( * ) Notice: Subject to any disclaimer, the term of this patent is extended or adjusted under 35 U.S.C. 154(b) by 61 days.

(21) Appl. No.: 16/684,508

(22) Filed: Nov. 14, 2019

(65) Prior Publication Data

US 2021/0150428 A1    May 20, 2021

(51) Int. Cl.
*G06Q 10/04* (2012.01)
*G06Q 10/06* (2012.01)
*G06Q 50/28* (2012.01)

(52) U.S. Cl.
CPC ..... *G06Q 10/047* (2013.01); *G06Q 10/06313* (2013.01); *G06Q 50/28* (2013.01)

(58) Field of Classification Search
None
See application file for complete search history.

(56) References Cited

U.S. PATENT DOCUMENTS

| | | | |
|---|---|---|---|
| 2002/0140555 A1* | 10/2002 | Jette | E05F 15/74 340/540 |
| 2003/0050819 A1* | 3/2003 | Koenigbauer | G06Q 10/06315 705/7.24 |
| 2007/0269299 A1* | 11/2007 | Ross | B66F 9/085 414/347 |
| 2018/0072551 A1* | 3/2018 | Burkhard | B67C 7/0006 |

(Continued)

OTHER PUBLICATIONS

Collaborative Optimization of Storage Location Assignment and Path Planning in Robotic Mobile Fulfillment Systems Cai, Jianming; Li, Xiaokang; Liang, Yue; Ouyang, Shan. Sustainability13.10: 5644. MDPI AG. (2021) (Year: 2021).*

(Continued)

*Primary Examiner* — Folashade Anderson
(74) *Attorney, Agent, or Firm* — Fish & Richardson P.C.

(57) ABSTRACT

In general, the subject matter described in this disclosure can be embodied in methods, systems, and program products for routing items in a warehouse. A computing system receives a request to assign an inbound truck to a transport bay and determines an available subset of unloading paths, by removing any unloading path directed from a transport bay or inbound storage area that is currently occupied/assigned. The computing system determines an available subset of loading paths, by removing any loading path directed to a transport bay or outbound staging area that is currently occupied/assigned. The computing system identifies multiple available path combinations that each include an unloading path from the available subset of unloading paths (Continued)

and a loading path from the available subset of loading paths. The computing system determines a selected path combination based on the selected path combination having a most favorable score.

19 Claims, 14 Drawing Sheets

(56) References Cited

U.S. PATENT DOCUMENTS

2018/0290831 A1* 10/2018 Wolf ..................... G06Q 50/28
2018/0300435 A1* 10/2018 Eckman ............... G06Q 10/063

OTHER PUBLICATIONS

International Search Report and Written Opinion in International Application No. PCT/US2020/060576, dated Feb. 3, 2021, 16 pages.
International Preliminary Report on Patentability in International Appln. No. PCT/US2020/060576, dated May 27, 2022, 11 pages.

* cited by examiner

ASSIGNING WAREHOUSE RESOURCES TO AN INBOUND TRUCK TO MAXIMIZE WAREHOUSE THROUGHPUT

TECHNICAL FIELD

This document generally relates to technologies for moving physical goods into and out of warehouses in which physical goods are stored.

BACKGROUND

Warehouses often store physical goods on pallets within racks of the warehouses. Pallets may be flat transport structures that each support a collection of physical goods, and that are configured to allow forklifts and other machines to pick up and move the pallets with the physical goods are stored thereon. In some warehouses, forklifts directly put pallets into the warehouse racks and directly pull pallets from the warehouse racks.

Some warehouses are automated, and in such warehouses a variety of systems automatically (e.g., without human manipulation) put pallets into the racks and pull pallets from racks. Such systems are sometimes called Automatic Storage and Retrieval Systems (AS/RS). Example systems include conveyor belts to transport pallets from a warehouse dock at which the pallets are unloaded to vertical lift devices that are designed to lift pallets to different levels of a warehouse rack. The racks may be equipped with a cart on each level, and the cart may be designed to carry pallets from the vertical lift device to a final warehouse storage location in the racks. The systems may work in reverse order to pull pallets from the racks and move the pallets to the warehouse dock.

Trucks with pallets designated for storage at a warehouse may be able to dock at any of multiple transport bays at a docking area of the warehouse. Once a truck is docked, forklifts may unload the truck by moving pallets located within the truck to conveyer belts that transport the pallets to vertical lift devices and ultimately the warehouse racks. These same trucks once unloaded, or other trucks that arrive empty, may be loaded with pallets that the warehouse systems pull from the racks and transport to the warehouse dock.

SUMMARY

This document describes techniques, methods, systems, and other mechanisms for assigning warehouse resources to an inbound and/or outbound truck to maximize warehouse throughput. In certain warehouse configurations, items that are unloaded from trucks are initially moved to inbound storage areas in the docking area of the warehouse. Each inbound storage area may include a conveyor belt or other type of machine that transports the items to storage racks of the warehouse. The docking area of the warehouse may also include various outbound staging areas at which items to be loaded onto trucks are staged before they are actually loaded onto the trucks. A truck docked at a particular transport bay may be assigned one (or sometimes more) inbound storage areas to which unloaded items will be transported, and one (or sometimes more) outbound staging areas to which items pulled from the warehouse racks will be staged before loading onto the truck.

With such warehouse configurations, selection of the transport bay at which to dock a truck, along with selection of the inbound storage area and outbound staging area, can significantly impact the number of items that can be unloaded from the truck and loaded onto the truck during a given period of time. For instance, selecting an inbound storage area that is not unduly far from the transport bay can shorten the time to unload a truck. Moreover selecting an inbound storage area so that the unloading path that a forklift will traverse between the transport bay and the inbound storage area does not cross another path traversed by a different forklift can decrease the likelihood of collisions between forklifts, and increase the speed at which those forklifts can operate and hence decrease the required unloading time. Similar considerations apply when selecting an outbound staging area and therefore the loading path between the outbound staging area and a transport bay at which a truck is docked.

The computing system described in this document analyzes the current state of a warehouse in order to assign a transport bay to an inbound truck, along with an inbound storage area and an outbound staging area. The computing system may select these assignments by identifying all available unloading paths between available transport bays and available inbound storage areas, and identifying a score for each such available unloading path (where the score of each path is based on, for example, a physical distance of the unloading path). The computing system may also identify all available loading paths between available outbound staging areas and the available transport bays, and identify a score for each such available loading paths (where the score of each path is based on, for example, a physical distance of the loading path).

The computer system may then identify various comprehensive paths by identifying various combinations of an available unloading path and an available loading path that utilize the same transport bay, and may then identify a comprehensive score for each such comprehensive path. The computer system may do so by combining, for each comprehensive path, the score for the constituent unloading path and the score for the constituent loading path. Once the score for each comprehensive path has been identified, the computer system may select the comprehensive path with the most favorable score (e.g., the lowest score, in systems designed so that a low score indicates a better path than a higher score).

The computer system may output information that identifies the selected transport bay, selected inbound storage area, and selected outbound staging area that comprise the comprehensive path with the most favorable score. The output information may be used to route the inbound truck to the selected transport bay, and prompt manual or automated forklifts to shuttle goods from the truck to the selected inbound storage area. The output information may also prompt automated warehouse transport systems to pull items to be loaded onto the truck and stage those items at the selected outbound staging area.

As described in additional detail below, such techniques in which different paths are scored and combined to identify warehouse resources to assign to a truck may include the analysis additional paths, for example, put paths along which items are transported from inbound storage areas to warehouse storage locations in the stacks, and pull paths along which items are transported from warehouse storage locations to outbound staging areas.

The technologies described in this disclosure can provide various advantages. Implementing such technologies can shorten the time to unload and/or load a truck. The technologies described herein can also decrease the likelihood of a collision between forklifts or other machines that move goods from trucks to inbound storage areas, and from outbound staging areas to the trucks. The technologies described herein can also increase the efficiency of conveyor systems, decreasing the time that goods may sit on the conveyor systems, and increasing the capacity of a conveyor system. Further, the technologies described herein can limit the length of time that goods are exposed to potentially harmful temperatures, for example, by shortening the time that goods may be stored in the warehouse docking area, which may be warmer than a temperature at which goods are to be persistently stored. Similarly, docking areas for different transport bays may be cooled to different temperatures, and the temperature of the docking area at which a transport bay is located may factor into the selection of the transport bay.

As additional description to the embodiments described below, the present disclosure describes the following embodiments.

Embodiment 1 is a computer-implemented method for routing items in a warehouse. The method includes receiving, by a computing system, a request to assign an inbound truck arriving at the warehouse to a transport bay from among multiple transport bays at the warehouse that are structured to dock trucks. The method includes accessing, by the computing system, information that identifies a collection of unloading paths in the warehouse, the unloading paths being directed from the multiple transport bays to multiple inbound storage areas in the warehouse, the multiple inbound storage areas being areas in the warehouse that are arranged to temporarily store physical items unloaded from trucks docked at various of the transport bays. The method includes determining, by the computing system, an available subset of unloading paths from among the collection of unloading paths, by removing from the collection of unloading paths: (i) any unloading path directed from a transport bay, of the multiple transport bays, that is currently occupied by a truck, and (ii) any path directed to an inbound storage area, of the multiple inbound storage areas, to which a truck at any of the multiple transport bays is assigned. The method includes accessing, by the computing system, information that identifies a collection of loading paths in the warehouse, the loading paths being directed from multiple outbound staging areas in the warehouse to the multiple transport bays, the multiple outbound staging areas being areas in the warehouse that are arranged to stage physical items that are to be loaded onto trucks docked at various of the transport bays. The method includes determining, by the computing system, an available subset of loading paths from among the collection of loading paths, by removing from the collection of loading paths: (i) any loading path directed to a transport bay, of the multiple transport bays, that is currently occupied by a truck, and (ii) any loading path directed from an outbound staging area, of the multiple outbound staging areas, to which a truck at any of the multiple transport bays is assigned. The method includes identifying, by the computing system, multiple available path combinations that each include an unloading path from the available subset of unloading paths and a loading path from the available subset of loading paths that each use a same transport bay. The method includes identifying, by the computing system, a score for each available path combination of the multiple available path combinations, based on a score for the unloading path of the respective available path combination and a score for the loading path of the respective available path combination. The method includes determining, by the computing system, a selected path combination from among the multiple available path combinations, based on the selected path combination having a most favorable score from among scores of the multiple available path combinations. The method includes outputting, by the computing system, information that assigns the inbound truck to: (a) a selected transport bay used by the selected path combination, (b) an unloading path of the selected path combination that is directed from the selected transport bay to a selected inbound storage area, and (c) a selected loading path of the selected path combination that is directed from a selected outbound staging area to the selected transport bay.

Embodiment 2 is the computer-implemented method of embodiment 1. The method further comprises identifying, by the computing system for each currently-docked truck of multiple trucks currently docked at a respective transport bay of the multiple transport bays, an unloading path assigned to the respective truck from among the collection of unloading paths and a loading path assigned to the respective truck from among the collection of unloading paths. Determining the available subset of unloading paths includes: (a) removing from the collection of unloading paths any unloading path that crosses an unloading path that is assigned to any currently-docked truck, and (b) removing from the collection of unloading paths any unloading path that crosses a loading path that is assigned to any currently-docked truck. Determining the available subset of loading paths includes: (a) removing from the collection of loading paths any loading path that crosses an unloading path that is assigned to any currently-docked truck, and (b) removing from the collection of loading paths any loading path that crosses a loading path that is assigned to any currently-docked truck.

Embodiment 3 is the computer-implemented method of embodiments 1 or 2. The method comprises identifying, by the computing system, one or more transport bays of the multiple transport bays that have been designated as being out of service. Determining the available subset of unloading paths includes removing from the collection of unloading paths any unloading path that is directed from any of the one or more transport bays that have been designated as being out of service. Determining the available subset of loading paths includes removing from the collection of loading paths any loading path that is directed to any of the one or more transport bays that have been designated as being out of service.

Embodiment 4 is the computer-implemented method of any one of embodiments 1-3. The method comprises generating, by the computing system, a score for each unloading path in the collection of unloading paths, based on a physical distance or time length of the respective unloading path. The method further comprises generating, by the computing system, a score for each loading path in the collection of loading paths, based on a physical distance or time length of the respective loading path.

Embodiment 5 is the computer-implemented method of any one of embodiments 1-4, wherein the computing system generates the score for each unloading path in the collection of unloading paths and generates the score for each loading path in the collection of loading paths before the computing system receives the request to assign the inbound truck arriving at the warehouse to a transport bay.

Embodiment 6 is the computer-implemented method of any one of embodiments 1-5, wherein identifying the score for each available path combination of the multiple available path combinations includes weighting the score for the unloading path of the respective path combination differently than the score for the loading path of the respective path combination.

Embodiment 7 is the computer-implemented method of any one of embodiments 1-6, wherein outputting the information that assigns the inbound truck to the selected loading path includes sending information that causes an automated system in the warehouse to begin pulling physical items from storage and transporting those physical items to the selected outbound staging area.

Embodiment 8 is the computer-implemented method of any one of embodiments 1-7. The method comprises identifying, by the computing system, multiple to-be-unloaded physical items that are to be unloaded from the inbound truck. The method comprises determining, by the computing system, a collection of candidate put paths by identifying, for each combination of a to-be-unloaded physical item of the multiple to-be-unloaded physical items and each inbound storage area to which an unloading path in the available subset of unloading paths is directed, a put path that is directed from the respective inbound storage area to a location at which the respective to-be-unloaded physical item is to be stored in the warehouse. Identifying the multiple available path combinations includes identifying path combinations that each include (a) an unloading path from the available subset of unloading paths, (b) a put path from the collection of candidate put paths, the respective put path being from the inbound storage area of the respective unloading path, and (c) a loading path from the available subset of loading paths, the respective loading path identifying a same transport bay as the respective unloading path. Identifying the score for each available path combination of the multiple path combinations is based on (a) the score for the unloading path of the respective path combination, (b) a score for the put path of the respective path combination, and (c) the score for the loading path of the respective path combination.

Embodiment 9 is the computer-implemented method of embodiment 8. The method comprises identifying, by the computing system, multiple to-be-loaded physical items that are to be loaded onto the inbound truck. The method comprises determining, by the computing system, a collection of candidate pull paths by identifying, for each combination of a to-be-loaded physical item of the multiple to-be-loaded physical items and each outbound staging area from which a loading path in the available subset of loading paths is directed, a pull path from a storage location in the warehouse for the respective to-be-loaded physical item to an outbound staging area for the respective loading path. Identifying the multiple available path combinations includes identifying path combinations that each include (a) an unloading path from the available subset of unloading paths, (b) a put path from the collection of candidate put paths, the respective put path being from the inbound storage area of the respective unloading path, (c) a pull path from the collection of candidate pull paths, the pull path being directed to the outbound staging area of a loading path, and (d) the respective loading path from the available subset of loading paths, the respective loading path identifying a same transport bay as the respective unloading path. Identifying the score for each available path combination of the multiple path combinations is based on (a) the score for the unloading path of the respective path combination, (b) the score for the put path of the respective path combination, (c) the score for the pull path of the respective path combination, and (d) the score for the loading path of the respective path combination.

Embodiment 10 is the computer-implemented method of embodiment 8. The collection of candidate put paths includes multiple put paths for a first to-be-unloaded physical item of the multiple to-be-unloaded physical items that is directed from a first inbound storage area to storage, including a first put path from the first inbound storage area to a first storage location and a second put path from the first inbound storage area to a second storage location, the first put path having a different score than the second put path. The multiple available path combinations includes: a first path combination including (a) an unloading path from a first transport bay to the first inbound storage area, (b) the first put path from the first inbound storage area to the first storage location, (c) a pull path from the first storage location to a first outbound staging area, and (d) a loading path from the first outbound staging area to the first transport bay, and a second path combination including (a) the unloading path from the first transport bay to the first inbound storage area, (b) the second put path from the first inbound storage area to the second storage location, (c) a pull path from the second storage location to the first outbound staging area, and (d) the loading path from the first outbound staging area to the first transport bay. The selected path combination is the first path combination.

Embodiment 11 is the computer-implemented method of embodiment 10, wherein the first put path has a more favorable score than the second put path based on a physical distance or time length of the first put path being less than a physical distance or time length of the second put path.

Embodiment 12 is the computer-implemented method of embodiment 10, wherein the first put path has a more favorable score than the second put path despite a physical distance or time length of the first put path being greater than a physical distance or time length of the second put path, based on the first storage location having a more favorable temperature for storage of the first physical item than a temperature of the second storage location.

Embodiment 13 is directed to one or more computer-readable devices having instructions stored thereon, that when executed by one or more processors, cause the performance of actions according to the method of any one of embodiments 1 through 12.

Embodiment 14 is a warehouse system. The warehouse system includes multiple transport bays at a warehouse that are structured to dock trucks. The warehouse system includes multiple inbound storage areas in the warehouse that are arranged to temporarily store physical items unloaded from trucks docked at various of the transport bays. The warehouse system includes multiple outbound staging areas being areas in the warehouse that are arranged to stage physical items that are to be loaded onto trucks docked at various of the transport bays. The warehouse system includes a computing system that includes one or more processors and one or more non-transitory computer-readable devices including instructions that, when executed by the one or more processors, cause the computing system to perform operations. The operations include receiving, by the computing system, a request to assign an inbound truck arriving at the warehouse to a transport bay from among the multiple transport bays. The operations includes accessing, by the computing system, information that identifies a collection of unloading paths in the warehouse, the unloading paths being directed from the multiple transport bays to the multiple inbound storage areas in the warehouse. The operations include determining, by the computing system, an available subset of unloading paths from among the collection of unloading paths, by removing from the collection of unloading paths: (i) any unloading path directed from a transport bay, of the multiple transport bays, that is currently occupied by a truck, and (ii) any path directed to an inbound storage area, of the multiple inbound storage areas, to which a truck at any of the multiple transport bays is assigned. The operations include accessing, by the computing system, information that identifies a collection of loading paths in the warehouse, the loading paths being directed from multiple outbound staging areas in the warehouse to the multiple transport bays, the multiple outbound staging areas being areas in the warehouse that are arranged to stage physical items that are to be loaded onto trucks docked at the transport bays. The operations include determining, by the computing system, an available subset of loading paths from among the collection of loading paths, by removing from the collection of loading paths. The operations include (i) any loading path directed to a transport bay, of the multiple transport bays, that is currently occupied by a truck, and (ii) any loading path directed from an outbound staging area, of the multiple outbound staging areas, to which a truck at any of the multiple transport bays is assigned. The operations include identifying, by the computing system, multiple available path combinations that each include an unloading path from the available subset of unloading paths and a loading path from the available subset of loading paths that each use a same transport bay. The operations include identifying, by the computing system, a score for each available path combination of the multiple available path combinations, based on a score for the unloading path of the respective available path combination and a score for the loading path of the respective available path combination. The operations include determining, by the computing system, a selected path combination from among the multiple available path combinations, based on the selected path combination having a most favorable score from among scores of the multiple available path combinations. The operations include outputting, by the computing system, information that assigns the inbound truck to: (a) a selected transport bay used by the selected path combination, (b) an unloading path of the selected path combination that is directed from the selected transport bay to a selected inbound storage area, and (c) a selected loading path of the selected path combination that is directed from a selected outbound staging area to the selected transport bay.

Embodiment 14 is directed to the warehouse system of embodiment 14, wherein the instructions, when executed by the one or more processors, cause the computing system to perform the operations of any one of embodiments 2 through 12.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
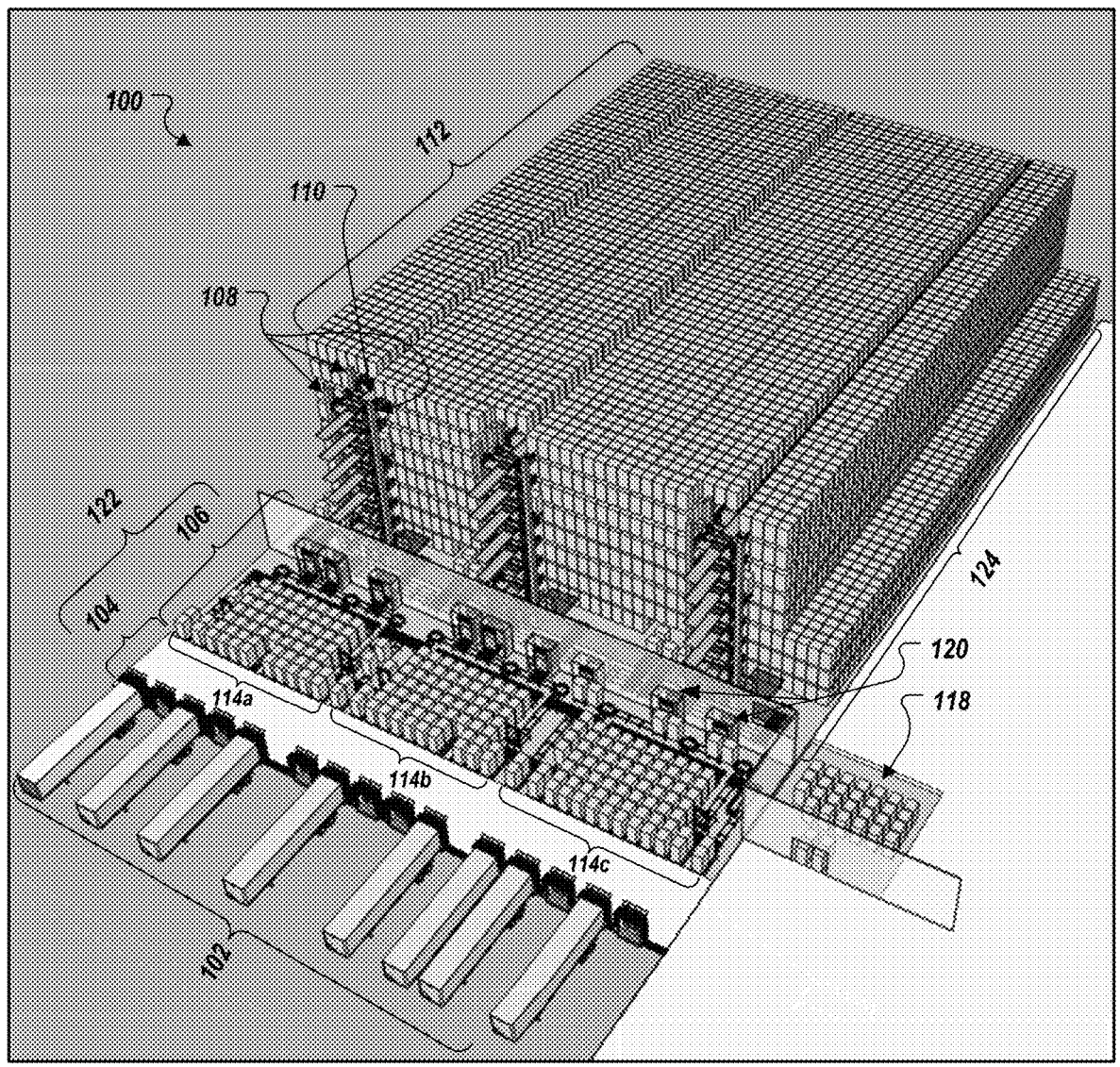
FIGS. 1-4 show different views of an example automated warehouse.

This document generally describes assigning warehouse resources to an inbound truck to maximize warehouse throughput. As mentioned above, a warehouse may include multiple transport bays (sometimes called dock doors) at which trucks may arrive to unload and/or load goods. At any given time, there may be numerous trucks unloading goods to various different inbound storage areas at which goods are temporarily stored before being moved into warehouse racks. Further, there may be various outbound staging areas at which goods are staged after being pulled from the warehouse racks, before those goods are loaded into trucks. The selection of a transport bay, inbound storage area, and outbound staging area for a truck affects the speed at which that truck is able to load and unload its goods, along with the efficiency at which systems in the warehouse may move the goods to and from the warehouse racks. The following description expands on these concepts and describes various technologies for assigning a truck to a transport bay, an inbound storage area, and an outbound staging area.

Turning to FIGS. 1-4, different views are shown of an example automated warehouse 100 and its components, which can be arranged in different configurations to generate an optimized automated warehouse. Example warehouse components include truck doors/transport bays 102 that serve as an interface between trucks (e.g., cargo trailers) and the warehouse 100, and through which storage items from the trucks are loaded/unloaded. The warehouse components can further include forklifts that serve as a primary mechanism through which storage items (e.g., pallets of frozen food items) are loaded/unloaded from the trucks, although other mechanisms for loading/unloading the storage items can also be used.

The forklifts can be manually operated and/or automatically operated (e.g., computer operated without human input that manipulates the forklifts and/or selects destinations for the forklifts). Forklifts can travel across a portion 104 of a docking area 122 of the warehouse 100, which may be an open part of the warehouse 100 that permits devices to maneuver between the doors/bays 102 and the automated components of the warehouse 100. The automated components of the warehouse 100 can include conveyors 106 (including inbound-outbound conveyor modules 114 and routing conveyor modules 116), vertical lift devices 108, and carts 110 in the storage racks 112. The vertical lift devices 108 and carts 110 can be part of an automated shuttling system that transfers items between warehouse storage locations in the racks 112 and the conveyors 106. The conveyors 106 can move storage items from the forklifts to the vertical lift devices 108, which lift the storage items to the appropriate row/level of the racks 112. The carts 110 can deliver the storage items from the vertical lift devices 108 to the assigned warehouse storage location for each storage item. Additional and/or alternative automation features are also possible. For example, rather than or in addition to vertical lift devices 108, the system may include cranes or other types of lifts to raise or lower items within the warehouse 100.

Control algorithms, such as those running on a warehouse management computing system (e.g., which can include multiple different layers of software systems for different types of actions and communications occurring outside of and inside of the warehouse), can be used to direct and control the operation of the warehouse 100 and its components to ensure that storage items are carried to the appropriate locations in an efficient manner.

The warehouse 100 can have one or more docking areas 122 and one or more storage areas 124. In the examples shown in FIGS. 1-4, the warehouse 100 has a single docking area 122 and a single storage area 124. The docking area 122 provides a space in the warehouse 100 to queue inbound storage items (e.g., storage items that have been unloaded from an incoming truck and that are to be stored in the storage racks 112 of the warehouse) and to queue outbound storage items (e.g., storage items that have been removed from the storage racks 112 and that have been assigned to be loaded onto an outgoing truck).

The docking area 122 can include a row of truck doors/transport bays at which delivery trucks can park and have storage items loaded off of and/or onto the trucks. In some warehouses, the docking area 122 also serves as an interface or buffer zone between the trucks and the storage area 124 of the warehouse. For example, in a cold-storage warehouse, the storage area 124 may be maintained at very low temperatures in order to keep inventory (e.g., storage items) that is stored on the storage racks 112 frozen. Some storage items may require their corresponding storage area 124 to be kept as low as –20 degrees Fahrenheit, although lower or higher temperatures may also be possible depending on the precise requirements of the inventory.

A physical barrier, such as one or more insulated walls, may separate the docking area 122 from the storage area 124 in order to provide different climate conditions in the docking area 122 and the storage area 124. The physical barrier may also prevent cooling loss from a refrigerated storage area 124. For example, to ensure minimal cooling loss, only a limited number of relatively small passages 120 (e.g., air locks) may be provided in a dividing wall between the docking area 122 and storage area 124 to allow inbound storage items and/or outbound storage items to be transferred between the docking area 122 and the storage area 124 (e.g., on conveyors 106). In some examples, a storage area 124 has a lower oxygen level than the docking area 122, for example, due to an increased amount of nitrogen in the storage area 124 to limit the likelihood of fire.

Figure 2:
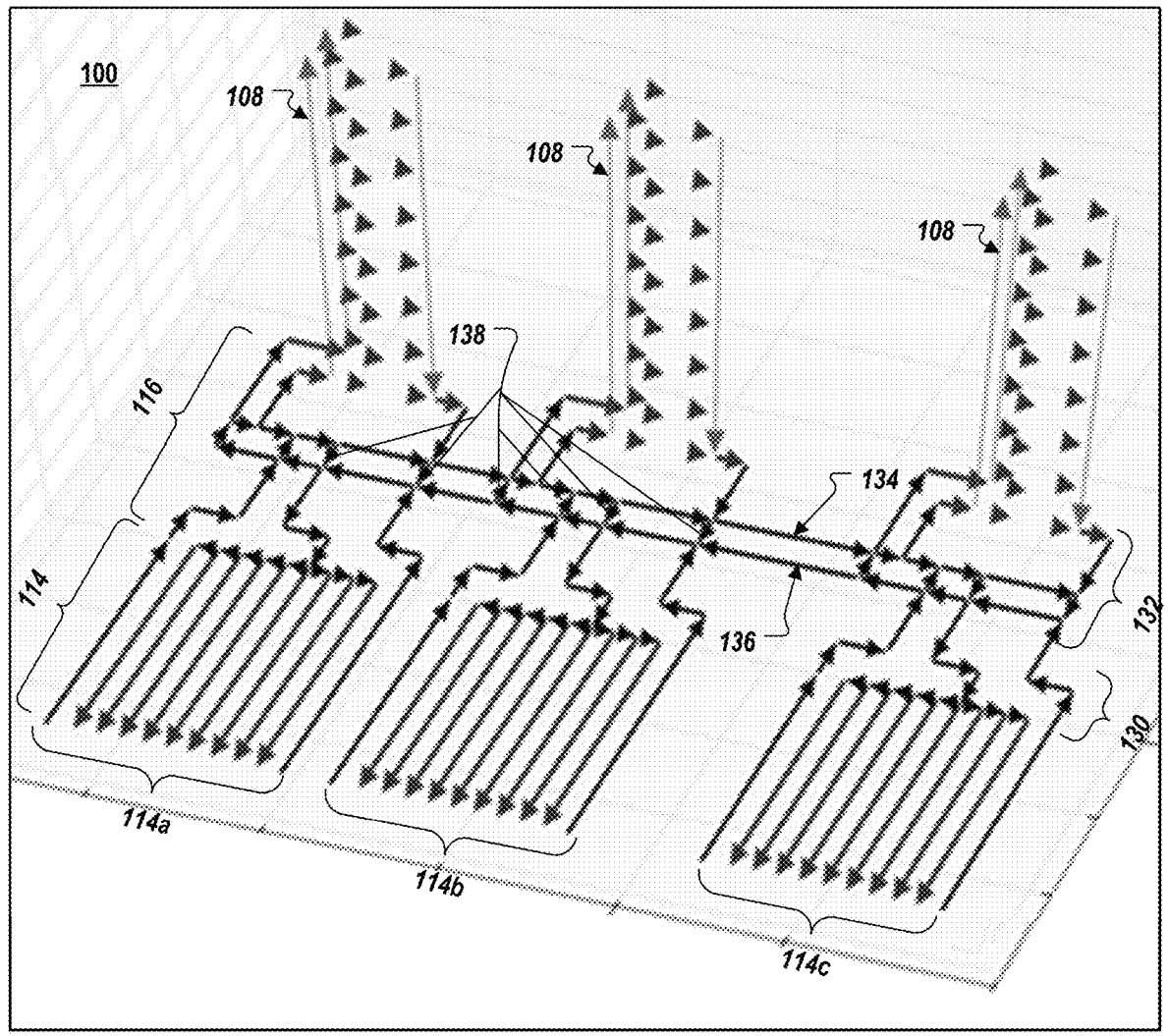
Figure 3:
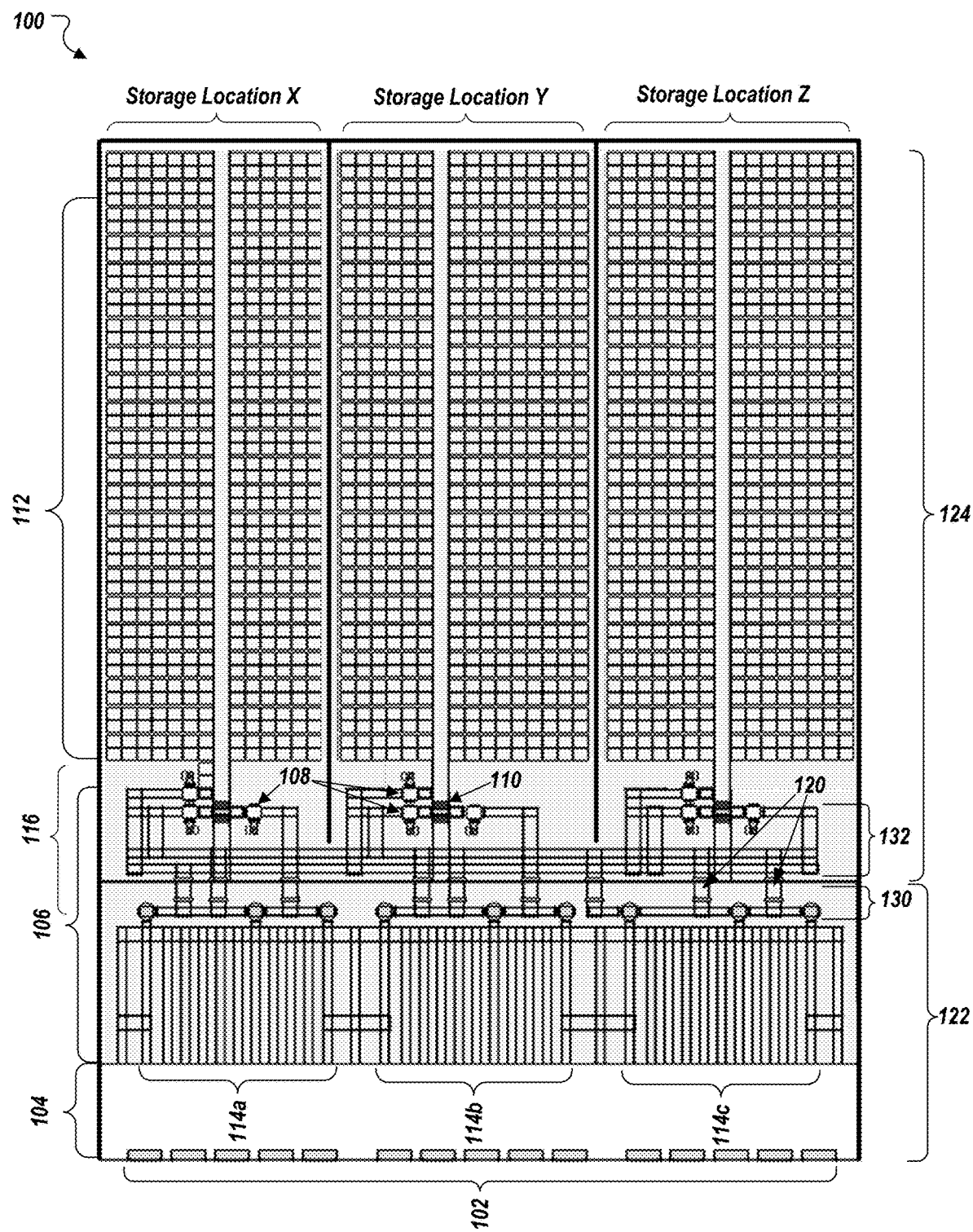

In some implementations, the docking area 122 includes a series of inbound-outbound conveyor modules 114. FIGS. 1-3 show three such I/O conveyor modules 114a-c, by way of example. The number of I/O conveyor modules 114 in the docking area 122 may be selected as a function of the size of the docking area 122 and the storage area 124 (or both), the number and arrangement of truck doors/transport bays 102, and the anticipated volume of inbound and outbound delivery processing. Each I/O conveyor module 114 may be primarily assigned to handle inbound and outbound delivery processing for a respective set of "n" truck doors/transport bays 102 that are located proximate to the I/O conveyor module 114, so as to minimize the distance required for forklifts to load and unload storage items between the trucks doors/transport bays 102 and their corresponding module 114. In some configurations of I/O conveyor modules 114, each I/O conveyor module 114 is assigned to handle deliveries from a set of five truck doors/transport bays 102. Other assignments are possible as well, such as providing a different I/O conveyor module 114 for every 2, 3, 4, 6, 7, or 8 truck doors/transport bays 102. In some examples, forklifts load and unload storage items between a truck door/transport bay and an I/O conveyor module 114 that is not proximate the truck door/transport bay (e.g., between the leftmost truck door/transport bay 102 depicted in FIG. 1 and the conveyor module 114b).

Figure 4:
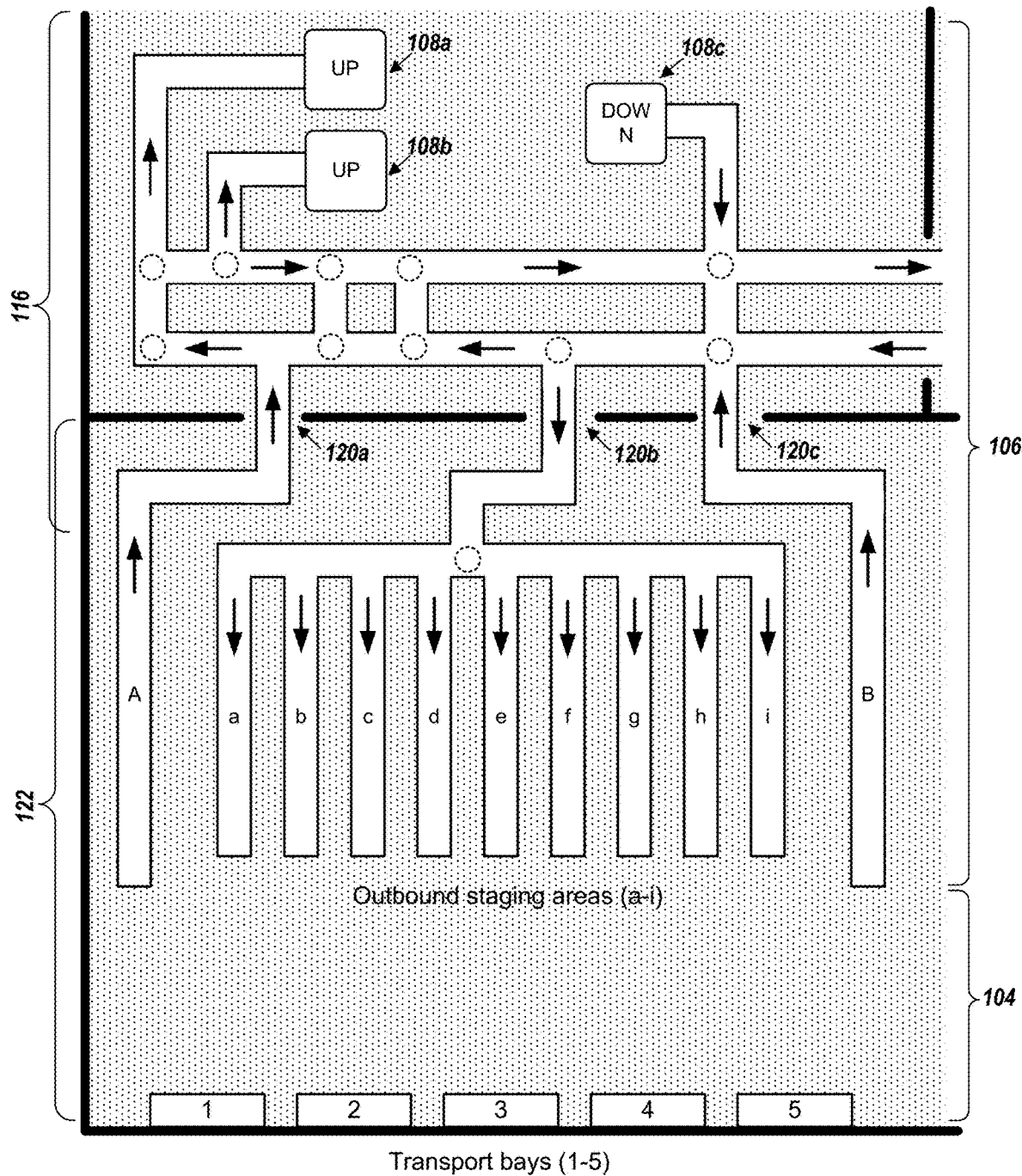
Figure 5A:
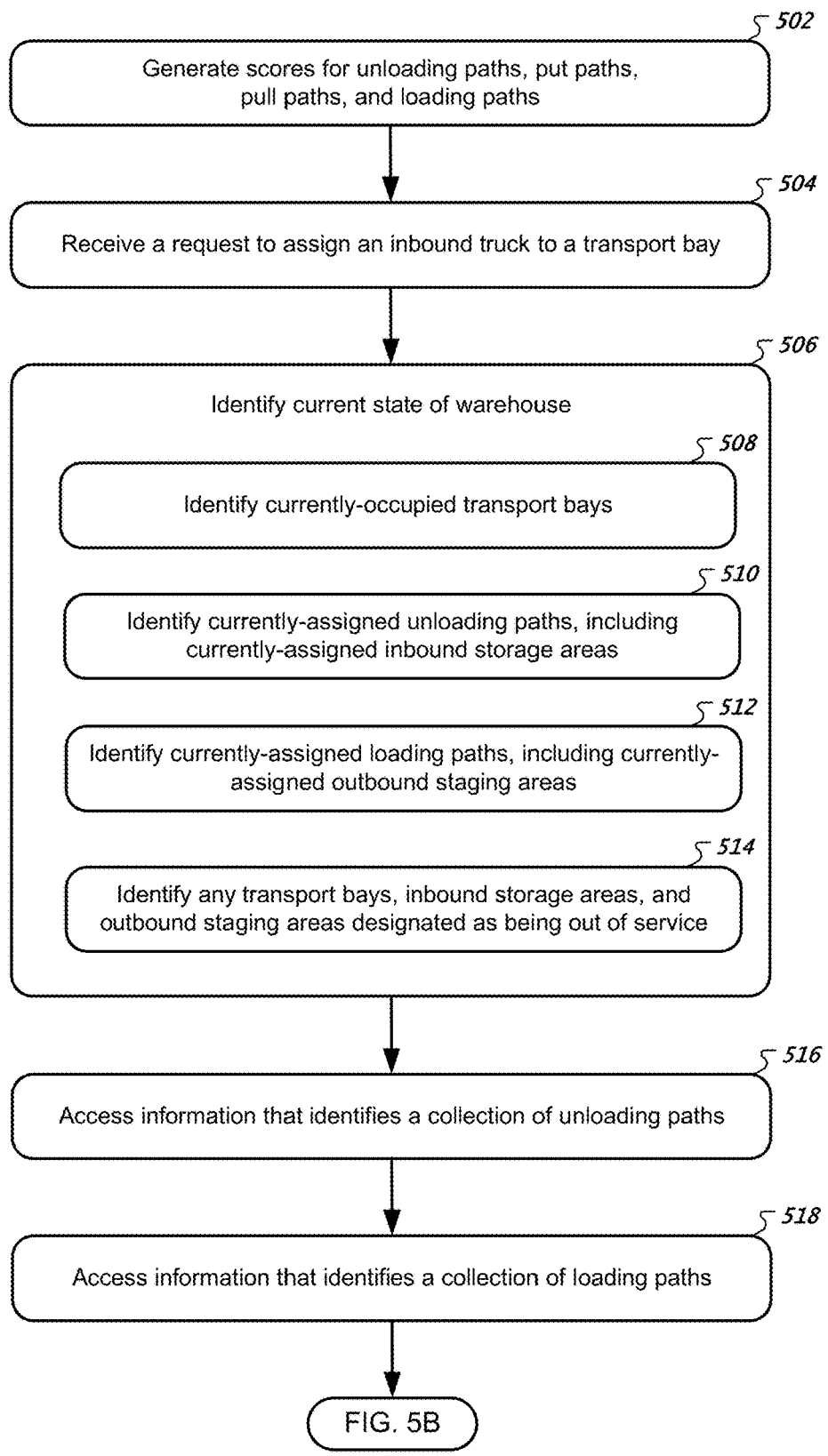
FIGS. 5A-F show a flowchart for assigning warehouse resources to an inbound truck.
Figure 5B:
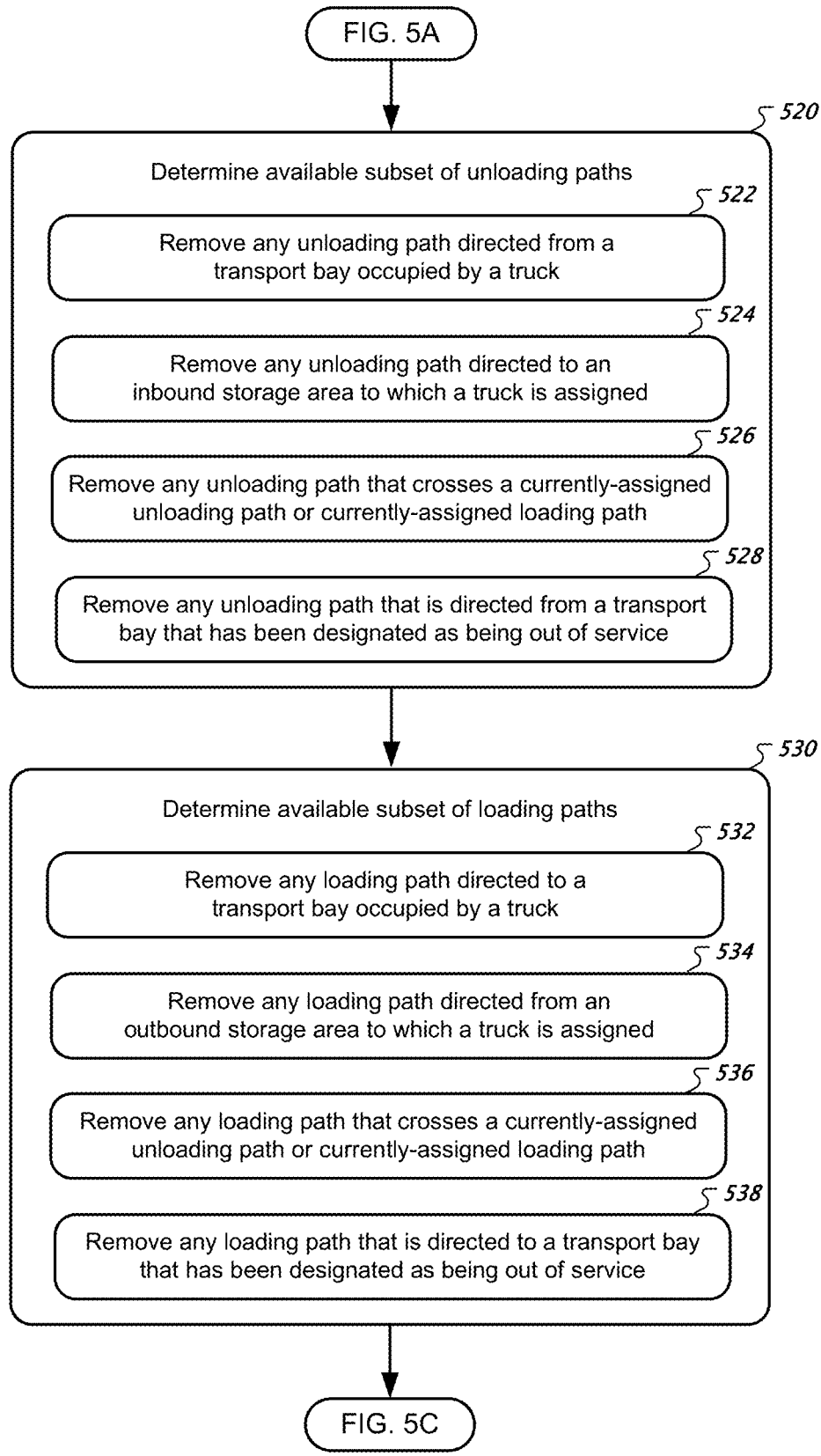
Figure 5C:
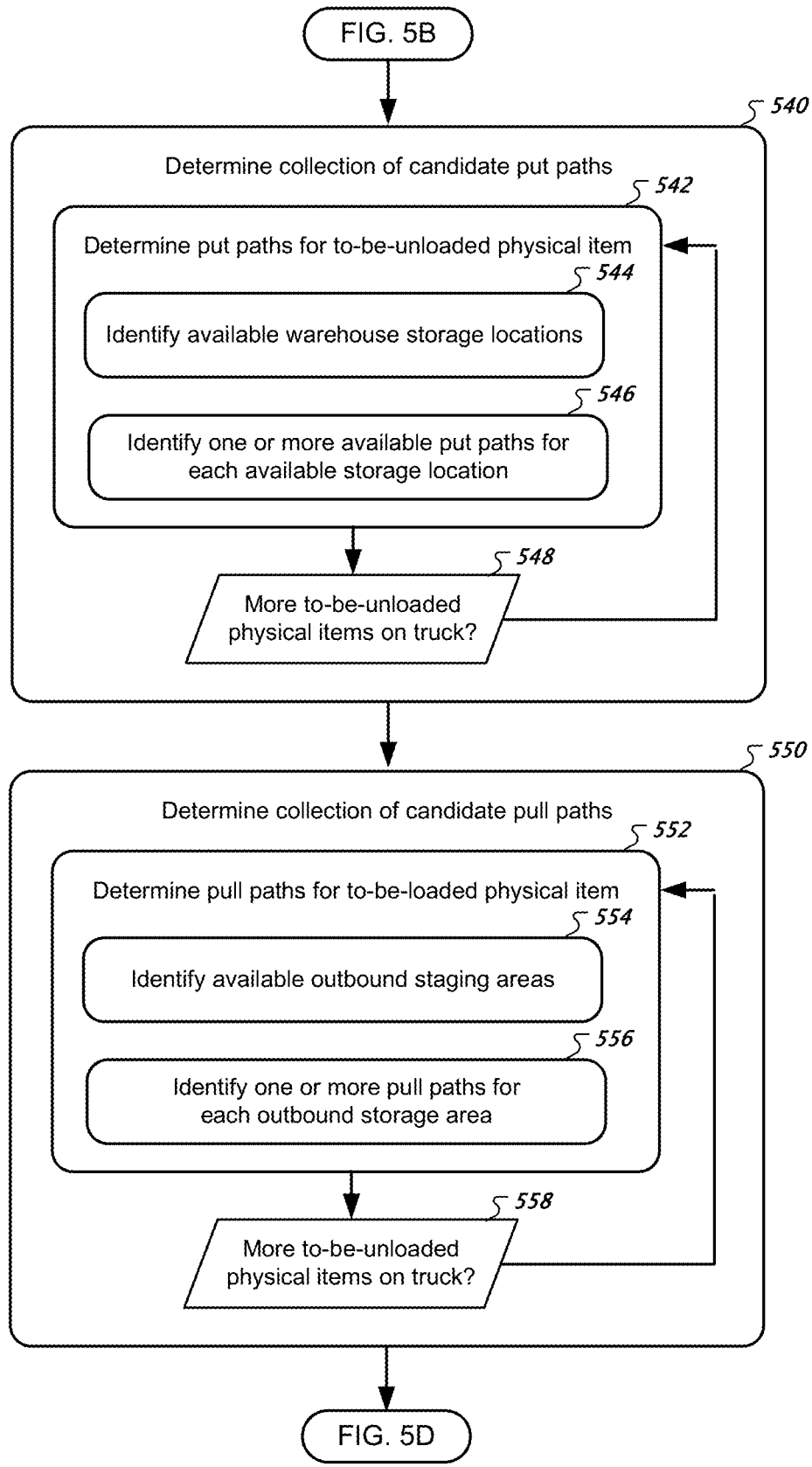
Figure 5D:
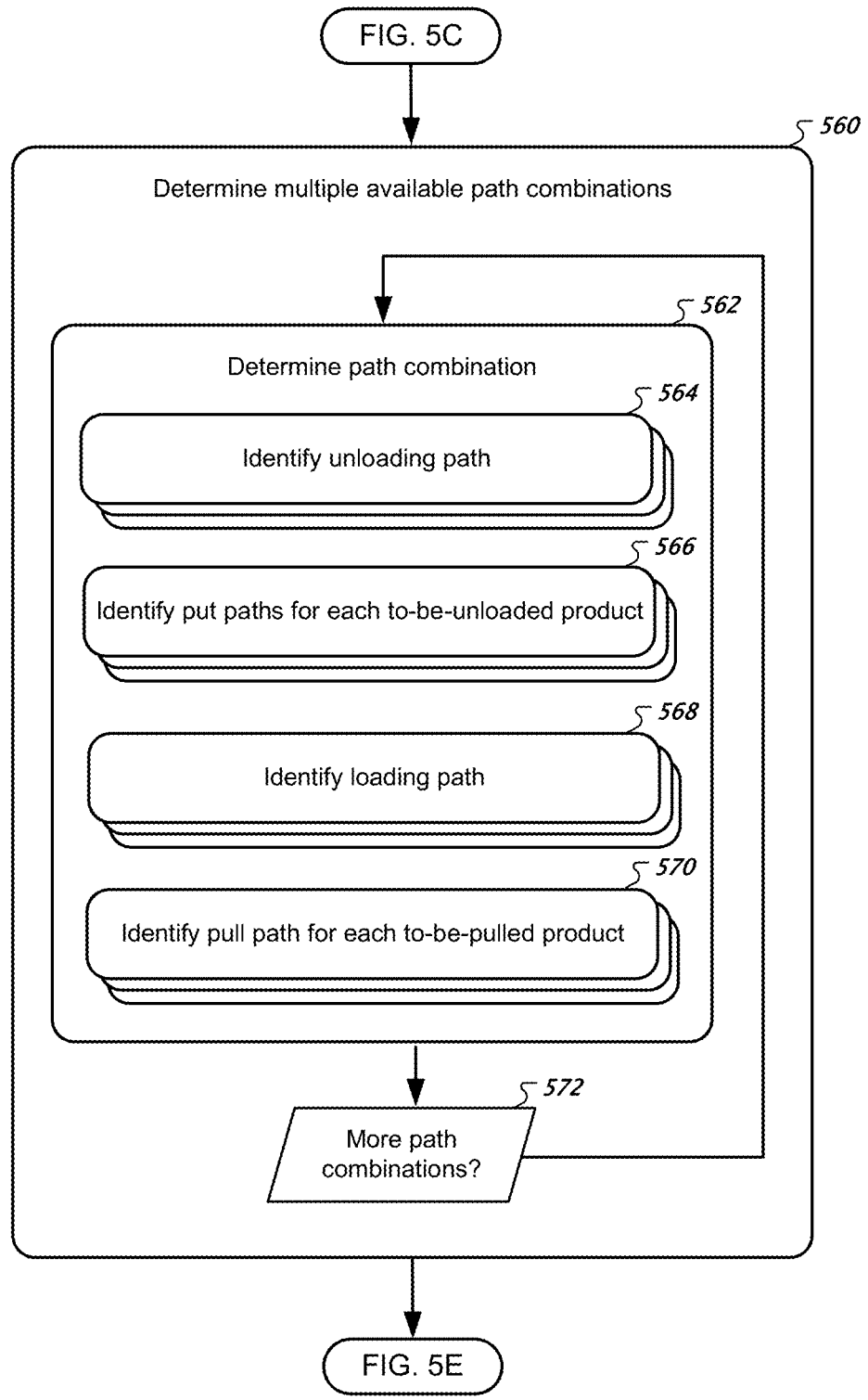
Figure 5E:
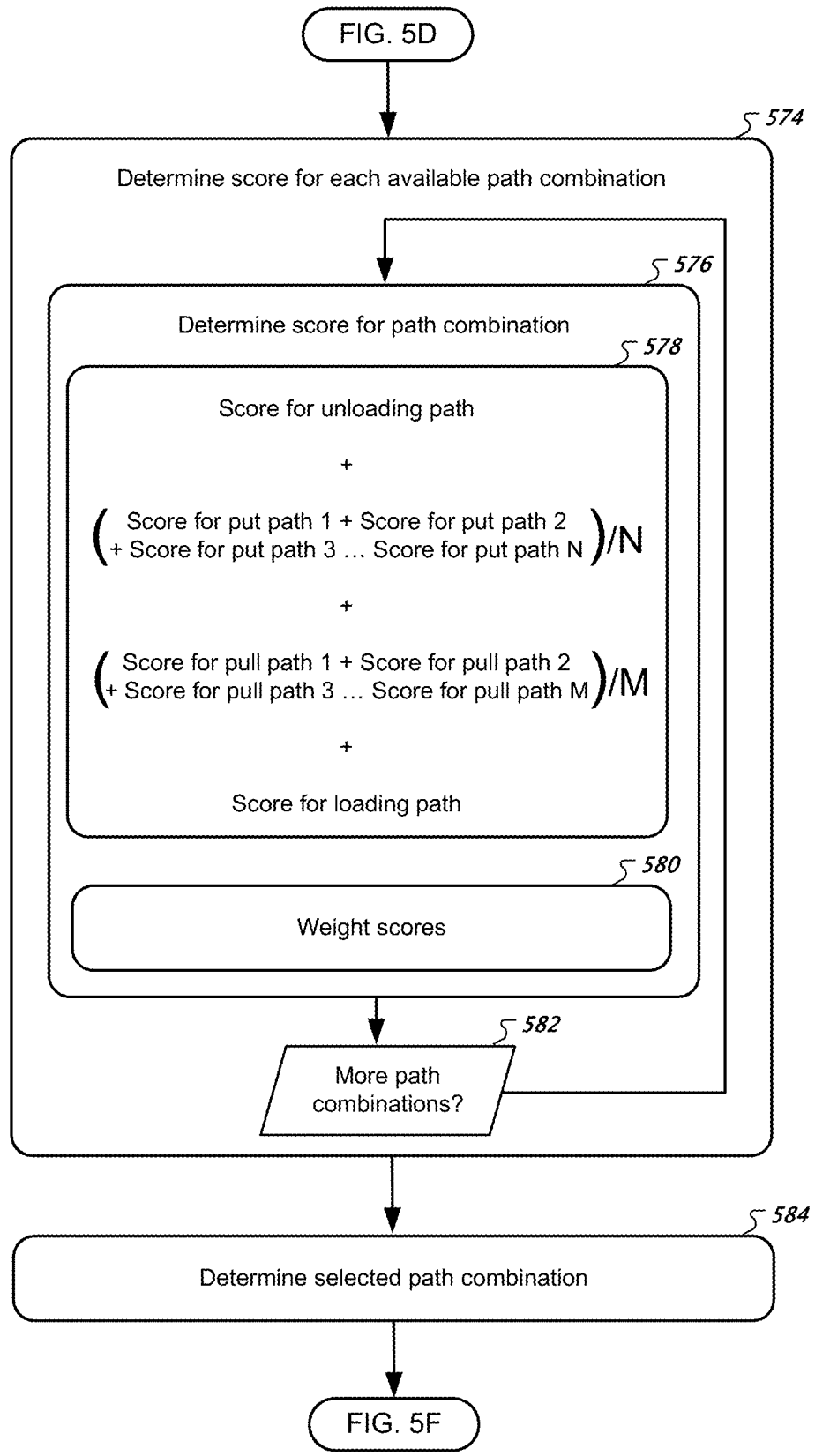
Figure 5F:
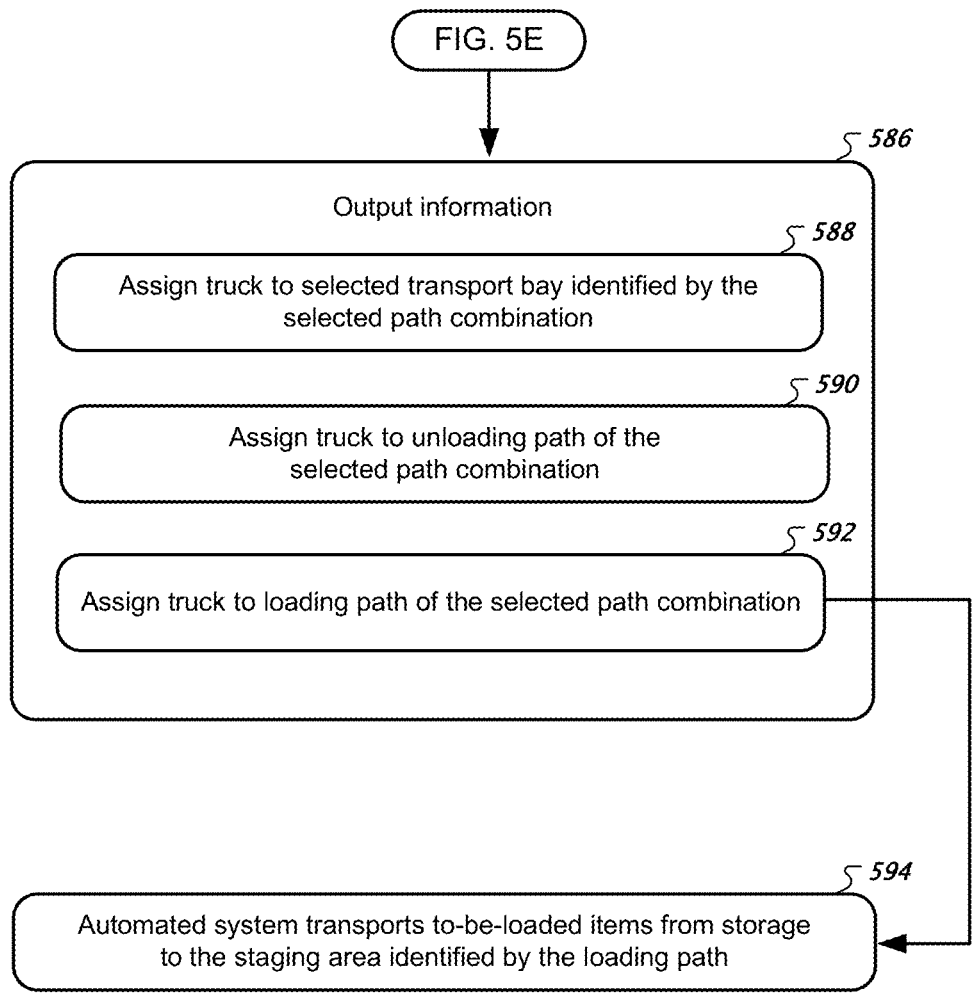

Each inbound-outbound conveyor module 114 includes a set of inbound conveyor lanes and a set of outbound conveyor lanes (referenced elsewhere in this disclosure as inbound storage areas and outbound staging areas, respectively). FIG. 4 shows a close-up view of the inbound lanes A and B and outbound lanes a-i running in parallel to each other in I/O conveyor module 114a. In some implementations, a total number of inbound conveyor lanes in each module 114, a total number of outbound conveyor lanes in each module 114, a ratio of inbound conveyor lanes to outbound conveyor lanes in each module 114, or a combination of these, may be determined so as to optimize performance factors of the warehouse 100. In the example automated warehouse 100 illustrated in FIGS. 1-4, each I/O module 114 includes two inbound conveyor lanes at the outermost positions of the module 114, with nine outbound conveyor lanes located there between (e.g., the two inbound lanes A and B flank a consecutive set of outbound lanes a-i).

In general, the I/O modules 114 are each provided with more outbound lanes than inbound lanes. The difference in the number of inbound and outbound lanes reflects the likelihood that loading trucks with outbound storage items (and the effort involved in staging products) may be a longer, less predictable process than unloading inbound storage items from the trucks. Moreover, by providing more outbound lanes, the docking area has additional capacity to queue outbound storage items in anticipation of a truck arrival so that the outbound items are ready to be loaded upon a truck arrival.

The system may provide fewer inbound conveyor lanes than outbound conveyor lanes while maintaining an acceptable level of performance (e.g., without degrading inbound item throughput rates) due to differences in how inbound storage items and outbound storage items are typically handled in the docking area 122. For example, human-operated or automated forklifts can typically carry inbound storage items directly to available inbound conveyor lanes 128 without sorting the inbound items before they are placed on the inbound lanes (for instance, inbound items may simply be unloaded from a truck in a natural order according to their arrangement in the truck).

The inbound conveyor lanes of I/O modules 114, and inbound lanes of routing conveyors 116, may then direct inbound storage items to a vertical lift device 108, for example, to be lifted to storage in the storage racks 112 without further re-arrangement of the inbound items on the conveyors. In contrast, in order to facilitate more efficient truck loading times in the docking area 122, outbound storage items that have just been taken from the racks 112 may be arranged and re-arranged in the storage area 124 so as to direct the outbound items to specific outbound conveyor lanes that are likely to minimize truck loading times. As such, more lanes (and, in some instances, longer lanes with greater numbers of pallet turning points) may be provided to carry outbound storage items in the I/O modules 114 and routing module 116 to facilitate the ability to sort and re-arrange outbound storage items. Further, the extra outbound lanes may permit greater numbers of outbound items to be queued in the docking area 122 so that the items can be loaded efficiently into outbound delivery trucks.

The ratio of outbound to inbound lanes in each module may be 9:2 (as shown in FIGS. 1-4), 2:1, 3:1, 4:1, 5:1, 6:1, or other suitable ratios (e.g., ratios in which each module includes all inbound lanes or all outbound lines). Moreover, the number of outbound lanes in each I/O conveyor module 114 may be determined, in part, based on the number of truck doors/delivery bays 102 assigned to the module 114. In general, as the number of truck doors/delivery bays 102 assigned to a given module 114 is increased, the number of outbound conveyor lanes 126 in the module 114 may also be increased. In various examples, a ratio of about two outbound delivery lanes for each assigned truck door/delivery bay 102 may yield desirable performance factors.

The lengths of outbound conveyor lanes and inbound conveyor lanes in the I/O conveyor modules 114a-c is also a factor that impacts how many storage items may be queued in the docking area 122 while waiting for truck deliveries or drop-offs. In some implementations, the lengths of all the inbound and outbound lanes is substantially equal, in that they extend to a particular distance from the back wall of the docking area 122. The inbound and outbound lanes should be sufficiently long to allow items to be queued in an efficient manner, but not so long as to unduly restrict the movement of forklifts that load and unload storage items from trucks at the truck doors/bays 102 and the inbound and outbound lanes.

Each I/O receiving module 114 may be located near one or more passages 120 through which conveyors pass to permit the transfer of storage items between the storage area 124 and the docking area 122 of the warehouse 100. Preferably, at least one inbound passage and at least one outbound passage is provided for each I/O receiving module 114. By providing separate inbound and outbound passages 120, fewer hang-ups or delays may result while inbound storage items and outbound storage items are transferred between the storage area 124 and the docking area 122. In some implementations, as shown in FIGS. 1-4, a single outbound passage 120 with conveyor connected to outbound lanes may serve a particular I/O conveyor module 114, while two inbound passages 120 with conveyors connected to inbound lanes also serve the particular I/O conveyor module 114.

The set of conveyors 106 may further include a routing conveyor module 116. The routing conveyor module 116 is configured to direct inbound and outbound storage items between I/O conveyor modules 114a-c and the vertical lift devices 108 (or another component of an automatic shuttling system). The routing conveyor module 116 may include conveyors 130 located in the docking area 122 and/or conveyors 132 located in the storage area 124. The routing conveyor module 116 may be configured to efficiently transport storage items carried on its conveyors from an I/O storage module 114 to a vertical lift device 108. In some implementations, the routing conveyor module 116 connects each I/O storage module 114 to each vertical lift device 108 and automated shuttling subsystem in the storage area 124. The routing conveyor module 116, its docking area conveyors 130, and/or its storage area conveyors 132 can also include redundant conveyor lanes such that, if one or more primary conveyor lanes becomes unusable (e.g., due to maintenance, repair, or processing delays and congestion), the redundant lanes may be used instead to maintain throughput at each of the I/O conveyor modules 114.

FIG. 2, for example, shows the flow of storage items in the automated warehouse 100 and depicts storage area conveyors 132 having bi-directional redundant loops that connect each of the I/O storage modules 114 with each of the vertical lift devices 108, with redundant paths there between. Inbound and outbound storage items can be directed along a first redundant conveyor lane 134 of the storage area conveyors 132 in the routing module 116, which may be configured to transport pallets in one general direction and/or multiple directions. Inbound and outbound storage items can also be directed along a second redundant conveyor lane 136 of the storage area conveyors 132 in the routing module 116, which may be configured to transport pallets in an opposite general direction and/or multiple directions.

The redundant conveyor lanes 134 and 136 are connected by multiple short connecting conveyor lanes 138 that provide multiple paths between different points on the conveyors 134 and 136, and as a result, provide multiple paths between the vertical lift devices 108 and the I/O storage modules 114. The connecting conveyor lanes 138 can be positioned along the conveyors 134 and 136 at locations where other conveyors from the vertical lift device 108 and the I/O storage modules 114 connect to the conveyors 134 and 136. The connecting conveyor lanes 138 and their positioning along the conveyors 134 and 136 can permit for more dynamic and redundant routing of pallets, which can avoid pallet traffic jams, and can allow for a greater and more dynamic use of vertical lift device 108 and I/O storage modules 114, regardless of a pallet's current position. The connecting conveyor lanes 138 can also permit for the minimization of other automation components, such as a reduction in the number of shuttling systems that are needed to process put and pull requests.

As mentioned above, each lane 134 and 136 in the storage area conveyors 132 may be configured to carry items bi-directionally as needed so that storage items can still be transported between any of the three vertical lift device 108 and any of the three I/O conveyor modules 114 in the event that one of the routing lanes 116 fails. The docking area conveyors 130 can, in some instances, include similar redundancies and/or common structures used across multiple directional lanes of conveyors.

In some implementations, the routing conveyors 116 (including docking area conveyors 130 and storage area conveyors 132), are configured to minimize the amount of time that storage items are located in the docking area 122 rather than the storage area 124. For example, in cold-storage facilities, the storage area 124 may be refrigerated to cool temperatures (e.g., −10 degrees Fahrenheit or other temperatures) to keep inventory that is stored in the storage area frozen. In contrast, the docking area 122 may not be cooled or may be cooled to a lesser extent than the storage area 124.

In order to prevent frozen storage items from thawing while being processed and moved in and out of storage, the system may include features that reduce the amount of time that the frozen storage items are located in non-refrigerated/non-frozen areas such as the docking area 122. Accordingly, the conveyors may be configured to sort and arrange outbound storage items in the refrigerated storage area 124 rather than the docking area 122. After outbound storage items have been sorted (e.g., to optimize truck load times in the docking area 122), the items may be directed to an appropriate outbound conveyor lane of an I/O module 114 in the docking area 122. Similarly, inbound storage items may be taken directly, or with minimal delay, out of the docking area 122 and into the storage area 124 for further processing, so as to reduce the time that the inbound items spend in the docking area 122.

In some implementations, a staging area 118 for pallets that are not involved in the normal flow of inbound and outbound processing may be provided outside of the docking area 122. For example, rejected pallets that cannot be placed in the storage racks 112 due to damage or other reasons may be temporarily stored in the staging area 118. The staging area 118 is separated from the docking area 122 so as to maximize the available use of space in the docking area 122 for routine inbound and outbound processing. For example, by removing the staging area 118 from the docking area 122, additional space is made available for inbound conveyor lanes (e.g., inbound lanes A and B in FIG. 4) and outbound conveyor lanes (e.g., outbound lanes a-I in FIG. 4) in the docking area 122.

Turning to FIGS. 5A-F, a flowchart for assigning warehouse resources to an inbound truck is shown. The description of the process depicted by this flowchart will sometimes reference the figures that have already been introduced, and FIGS. 6-8, which illustrate various different paths through which goods may be transferred within a warehouse.

Figure 6:
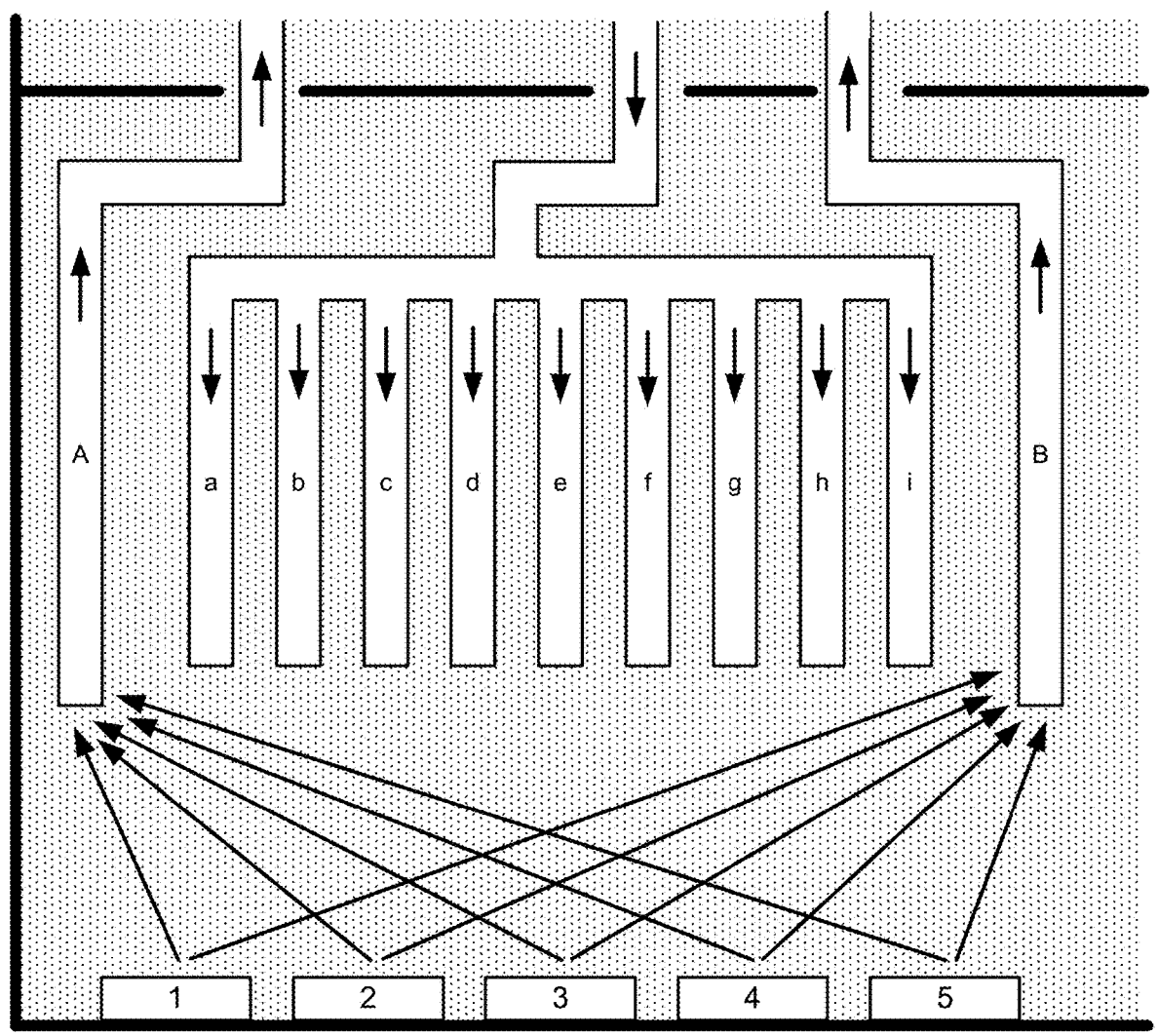
FIG. 6 illustrates unloading paths between transport bays and inbound storage areas.

At box 502, the computing system generates scores for various different types of paths through which goods may be transferred within a warehouse. These various different types of paths include unloading paths that transfer items from transport bays to inbound storage areas. FIG. 6 illustrates several such paths between transport bays 1-5 and inbound storage lanes A and B (these lanes are also called storage areas in this disclosure). References in this disclosure to any given unloading path may identify the transport bay from which a path is directed and the inbound storage area to which the path is directed. For example, the leftmost path illustrated in FIG. 6 may be referred to as the 1→A path, and the rightmost path illustrated in FIG. 6 may be referred to as the 5→B path.

Figure 7:
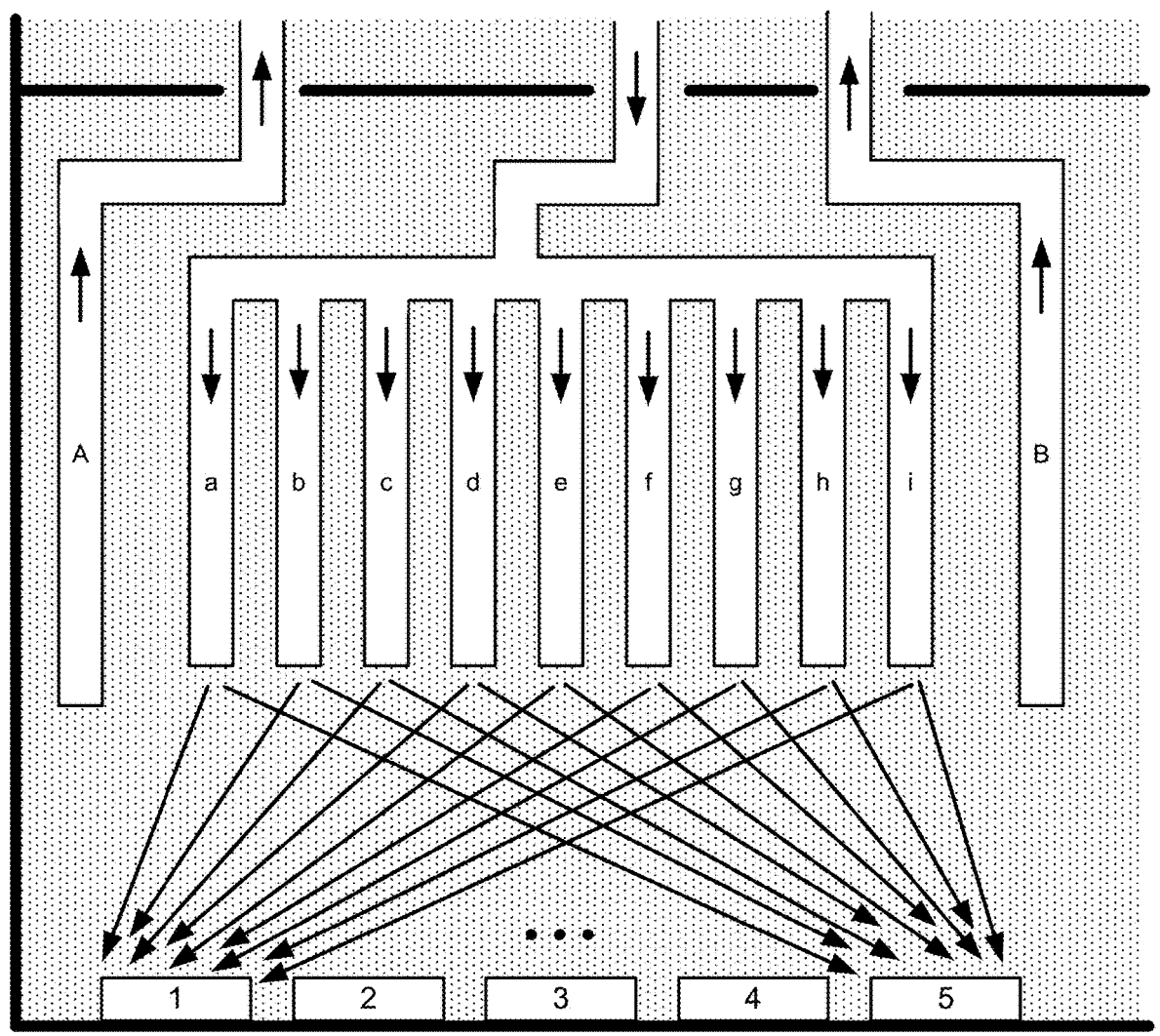
FIG. 7 illustrates loading paths between outbound staging areas and transport bays.

Another type of path analyzed by the computing system is a loading path, which represent the transfer of items from outbound staging areas to transport bays. FIG. 7 illustrates several such paths between outbound staging areas a-i and transport bays 1-5. As with the unloading paths, the loading paths may be referred to using the identifier of the outbound staging area and the identifier of the transport bay, for example, a→1, d→4, and i→5.

Figure 8:
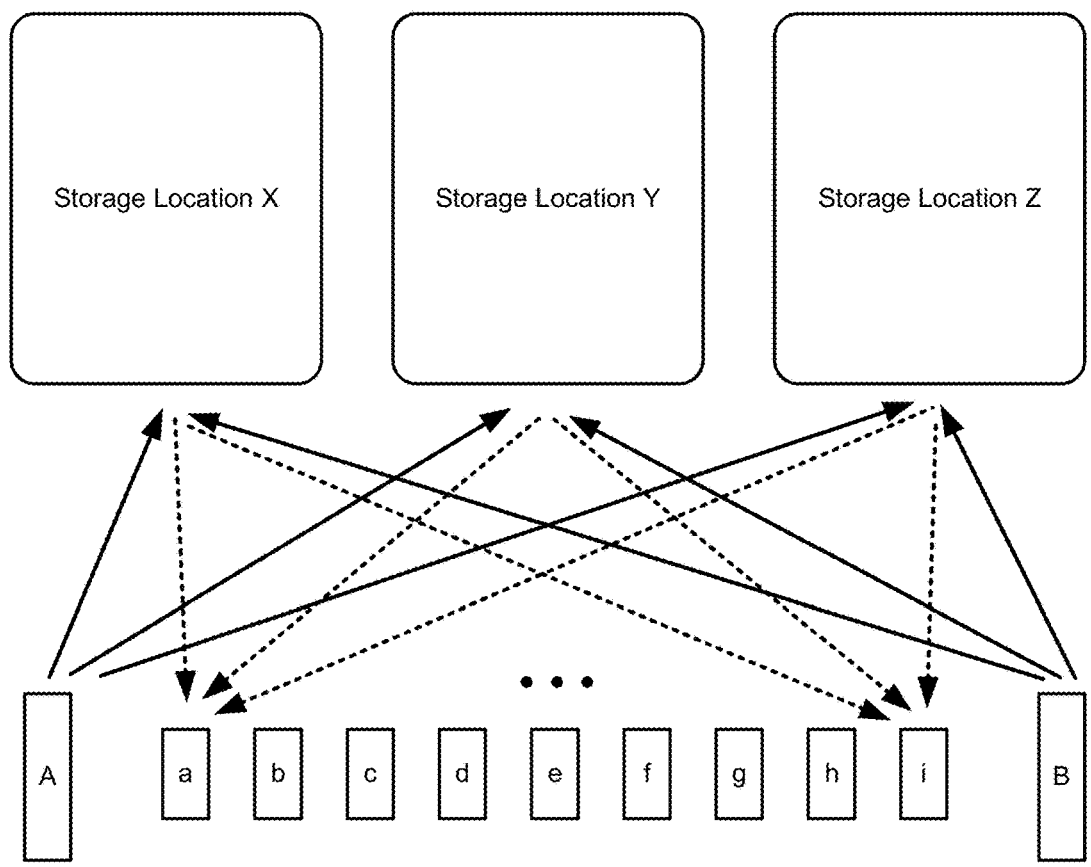
FIG. 8 shows put paths between inbound storage areas and warehouse storage locations, and pull paths between warehouse storage locations and outbound staging areas.

A third type of path is a put path, which represents the transfer of items between inbound storage areas and warehouse storage locations in the warehouse racks. These are paths that products may take when transported by a combination of conveyor systems 116, vertical lift devices 108, and carts 110. FIG. 8 includes solid arrows that illustrate several such paths, with the arrows being directed from inbound storage areas A and B to warehouse storage locations X, Y, and Z. In this example, each warehouse storage location represents an entire room, such that warehouse storage location X may store goods at a different temperature than warehouse storage location Y and warehouse storage location Z. Like with the unloading and loading paths, the put paths may be referred to using the identifier of the inbound storage area from which the put path is directed and the identifier of the warehouse storage location to which the put path is directed, for example, A→X or B→Y.

A fourth type of path is a pull path, which represents the transfer of goods from a warehouse storage location in the warehouse racks to an outbound staging area. FIG. 8 includes dotted arrows that illustrate several such paths, with the arrows being directed from warehouse storage locations X, Y, and Z to outbound staging areas a-i, for example, X→e, Y→h, and Z→a. FIG. 8 illustrates the put paths and pull paths as straight lines, but the put paths and pull paths would likely traverse more complex, sometimes three-dimensional paths defined by conveyor belts and vertical lift devices, as illustrated in FIGS. 1-4.

Returning to the description of box 502, the computing system can generate scores for the unloading paths, put paths, pull paths, and loading paths. It may generate a score for each such path depending on various criteria input into the system, such as a physical distance of each path, a time that it takes for an item to traverse each path, a redundancy of each path, a monetary cost to maintain or install machinery for each path, a value of reserving each path for later-arriving trucks, other factors that represent the value of any given path and the priority that the system should place on assigning a given path to an inbound truck, and various combinations of these different factors. In some examples, the leftmost transport bay for each inbound-outbound conveyor module 114 may have a highest priority score. For this reason, nearby outbound staging areas (e.g., staging areas 'a' and 'b') may have low priority scores, in order to leave the transport bays 1 and 2 more likely to remain open if trucks are arriving only to load goods. A goal of the scoring mechanism is to make sure that the system can fill as many transit bays as possible when taking into account future trucks and certain constraints (e.g., a desire to have no crossing paths, as discussed in additional detail below).

In some examples, each path may receive a score between 0 and 1, with 0 indicating that the path should receive highest priority and 1 indicating that the path should receive lowest priority, although other scoring systems are possible. In some examples, the system generates these scores for all such paths, without consideration for which paths may be assigned to trucks at any given moment. In other examples, the system generates scores that represent a specific state of utilization of the warehouse.

At box 504, the computing system receives a request to assign an inbound truck that is arriving at the warehouse to a transport bay from among multiple transport bays at the warehouse. For example, a truck may pull up to the warehouse and a driver of the truck may radio the dock master to request a transport bay assignment. The dock master may interact with the computing system to request a transport bay to which the truck is to be assigned. In other examples, a driver of the truck may radio the dock master when remote from the warehouse (e.g., 1, 5, 10, or 100 miles away from the warehouse) and request the same. In some examples, the truck driver may have a mobile computing device that is able to communicate with the warehouse computing system, and through which the truck driver may be able to initiate his or her own request for a transport bay assignment. In some examples, the truck may include a geographic positioning system (e.g., GPS), and a computing device on the truck may automatically contact the warehouse computing system and request a transport bay assignment when the truck is an appropriate distance from the warehouse (e.g., at the warehouse, or 1, 5, 10, or 100 miles away from the warehouse).

At box 506, the computing system may identify a current state of the warehouse. For example, the computing system may identify which transport bays are currently occupied by other trucks (box 508). This identification may include both those transport bays that are physically occupied by a truck and those transport bays to which a truck has been assigned but that may not be physically occupied by a truck at the moment (e.g., because the transport bay is reserved for the truck but the truck has not yet arrived).

The identification of the current state of the warehouse may include identifying currently-assigned unloading paths (box 510). These may be the paths between a currently-occupied transport bay and an inbound storage area that is assigned to the currently-occupied transport bay and the truck for which that transport bay is reserved. A truck being assigned to an unloading path is the same as the truck being assigned to the transport bay and inbound storage area that comprise that unloading path.

The identification of the current state of the warehouse may also include identifying the currently-assigned loading path (box 512). A loading path may be a path between an outbound staging area and a transport bay. A truck being assigned to a loading path is the same as the truck being assigned to the transport bay and outbound staging area that comprise the loading path.

The identification of the current state of the warehouse may also include identifying any transport bays, inbound storage areas, and outbound staging areas that are designated as being out of service (box 514), for example, because the respective warehouse component is broken or undergoing maintenance.

At box 516, the computing system accesses information that identifies a collection of unloading paths in the warehouse. FIG. 6 illustrates ten such unloading paths, each being directed from one transport bay to one inbound storage area. In the example shown in FIG. 6, every combination of paths from transport bays to inbound storage areas is represented, and the accessed information may similarly represent every combination of paths between transport bays and inbound storage areas in a warehouse (or at least between such features within a certain portion of the warehouse or within a certain proximity to each other within the warehouse, such as within 30 meters of each other). The accessed information may identify the collection of unloading paths in a table or other data structure that identifies two locations: a location from which each respective path is directed and a location to which the respective path is directed, as illustrated by the list 610 of "Unloading Paths" at the top of FIG. 6.

At box 518, the computing system accesses information that identifies a collection of loading paths in the warehouse. FIG. 7 illustrates forty-five such unloading paths, each being directed from one outbound staging area to one transport bay. In the example shown in FIG. 7, every combination of paths between the outbound staging areas and transport bays is represented, and the accessed information may similarly represent every combination of paths between outbound staging areas and transport bays in a warehouse (or at least between such features within a certain portion of the warehouse or within a certain proximity to each other within the warehouse, such as within 30 meters of each other). The accessed information may identify the collection of loading paths in a table or other data structure that identifies two locations: a location from which the path is directed and a location to which the path is directed, as illustrated by the list 710 of "Loading Paths" at the top of FIG. 7.

At box 520, the computing system determines an available subset of unloading paths. The computing system may do so by identifying those unloading paths identified at box 516 and determining which of those unloading paths do not suffer from the various deficiencies described below, such as already being assigned. From a nomenclature and conceptual perspective, this determination of a subset may be described as removing paths from a collection of paths, although on a computational basis the system need not actually "remove" certain paths from a list and can instead involve merely identifying a subset of paths that satisfy or do not satisfy criteria.

At box 522, determining the available subset of unloading paths can include removing any unloading path directed from a transport bay that is occupied by a truck. For example, the computing system may remove from the list 610 of unloading paths any one or more unloading paths that reference (e.g., identify, list, or include) a transport bay that the computing system has currently assigned to a truck (e.g., because the truck is currently docked at the transport bay).

At box 524, determining the available subset of unloading paths can include removing any unloading path directed to an inbound storage area to which a truck is assigned. For example, the computing system may remove from the list 610 of unloading paths any one or more unloading paths that reference an inbound storage area that the computing system has currently assigned to a truck (e.g., because items being unloading from the truck are being moved to the inbound storage area or will be moved to the inbound storage area). In some examples, a truck is unassigned from an inbound storage area and the inbound storage area is made available for assignment to another truck after the unloading process for the truck has completed, but before items have finished being loaded back onto the truck.

At box 526, determining the available subset of unloading paths can include removing any unloading path that crosses a currently-assigned unloading path or a currently-assigned loading path. For example, the computing system may remove from the list 610 of unloading paths any one or more of the unloading paths that would physically cross another path in the warehouse that is currently assigned to another truck. A purpose of preventing paths from crossing is so that any one or more forklifts that are shuttling back and forth on a path to load or unload a truck with goods can be less concerned about running into another forklift. As such, if paths cross, there is a potential that forklifts would collide because they would attempt to drive across the same part of the warehouse floor at the same time (e.g., a crossing point of the paths).

At box 528, determining the available subset of unloading paths can include removing any unloading path that is directed from a transport bay that has been designated as being out of service. For example, the computing system may remove from the list 610 of unloading paths any one or more of the unloading paths that reference a transport bay that the computing system has currently identified as being out of service. Similarly, although not illustrated in the flowchart of FIGS. 5A-F, the computing system may remove from the list 610 of unloading paths any one or more of the unloading paths that references an inbound storage area that is out of service (e.g., due to mechanical failure or maintenance).

The determination of the available subset of unloading paths may involve any combination of one or more of boxes 522-528, such that the computing system identifies a subset of the unloading paths (i.e., less than all initially-identified unloading paths) that are candidate paths along which products to be unloaded from the inbound truck may be transported, according to the criteria employed to select the available subset of unloading paths.

At box 530, the computing system determines an available subset of loading paths. The computing system may do so by identifying those loading paths accessed at box 518 and determining which of those paths do not suffer from various deficiencies described below, such as already being assigned.

At box 532, determining the available subset of loading paths can include removing any loading path directed to a transport bay that is occupied by a truck. For example, the computing system may remove from the list 710 of loading paths any one or more loading paths that reference a transport bay that the computing system has currently assigned to a truck (e.g., because the truck is currently docked at the transport bay).

At box 534, determining the available subset of loading paths can include removing any loading path directed from an outbound staging area to which a truck is assigned. For example, the computing system may remove from the list 710 of loading paths any one or more loading paths that reference an outbound staging area that the computing system has currently assigned to a truck (e.g., because items being loaded onto the truck or to be loaded onto the truck are located in the outbound staging area).

At box 536, determining the available subset of loading paths can include removing any loading path that crosses a currently-assigned unloading path or a currently-assigned loading path. For example, the computing system may remove from the list 710 of loading paths any one or more of the loading paths that would physically cross another path in the warehouse that is currently assigned to another truck.

At box 538, determining the available subset of loading paths can include removing any loading path that is directed to a transport bay that has been designated as being out of service. For example, the computing system may remove from the list 710 of loading paths any one or more of the loading paths that references a transport bay that the computing system has currently identified as being out of service. Similarly, although not illustrated in the flowchart of FIGS. 5A-F, the computing system may remove from the list 710 of loading paths any one or more of the loading paths that references an outbound staging area that is out of service (e.g., due to mechanical failure or maintenance).

The determination of the available subset of unloading paths may involve any combination of one or more of boxes 532-538, such that the computing system identifies a subset of the loading paths (i.e., less than all initially-identified loading paths) that are candidate paths along which products to be loaded on the inbound truck may be transported, according to the criteria employed to select the available subset of loading paths.

At box 540, the computing system determines a collection of candidate put paths for physical items to be unloaded from the inbound truck and stored at the warehouse. Each put path represents the path that a physical item may take from an inbound storage area to a location at which the physical item may be stored in the warehouse. The number of put paths can be larger than the number of unloading paths because items to be unloaded from the truck may be stored in a number of different warehouse storage locations. As such, the computing system may identify a number of different put paths that originate from each of multiple candidate inbound storage areas for each item. An example process for identifying one or more put paths for each item to be unloaded from the truck is described with reference to boxes 542-548.

At box 542, the computing system determines one or more put paths for a to-be-unloaded physical item. For example, the computing system may select a first item from potentially several (e.g., dozens or more) items to be unloaded from a truck, and may then identify available warehouse storage locations at which the first item may be stored (box 544). As an illustration, FIG. 8 illustrates various different put paths (810, in solid lines) between inbound storage areas A and B and warehouse storage locations X, Y, and Z. The storage areas X, Y, and Z may be rooms that store products at different temperatures, and the computing system may determine that characteristics of the first item are suitable for storage in warehouse storage locations X and Y (but not Z, in this example). As such, the computing system may identify that warehouse storage locations X and Y are the available inbound storage areas.

At box 546, the computing system identifies one or more available put paths for each of the available warehouse storage locations. Assuming that available unloading paths are directed to both inbound storage areas A and B, the available put paths would then be the various put paths that are directed from inbound storage areas A and B and that are directed to warehouse storage locations X and Y (A→X, A→Y, B→X, and B→Y).

At box 548, the computing system determines whether there are additional products to be unloaded from the inbound truck, for which the operations of boxes 542-546 are to be performed. Assuming that there is a second item to be unloaded from the truck that can be stored in warehouse storage locations Y and Z, the put paths identified for that second item may be A→Y, A→Z, B→Y, and B→Z. The operations of boxes 542-546 may continue until one or more put paths have been identified for each to-be-unloaded product on the inbound truck.

At box 550, the computing system determines a collection of candidate pull paths for physical items to be pulled from warehouse storage and loaded onto the inbound truck. The pull paths represent the path that a physical item may take from warehouse storage to an outbound staging area at which the physical item may sit until it is loaded onto the inbound truck. An example process for identifying one or more pull paths for each item to be loaded onto the truck is described with reference to boxes 552-558.

At box 552, the computing system determines one or more pull paths for a to-be-loaded physical item. For example, the computing system may select a first item from potentially several (e.g., dozens or more) items to be loaded onto a truck, and may then identify an available outbound staging area to which the pull path may be directed (box 554). As an illustration, FIG. 8 illustrates various different pull paths (820, in dotted lines) between warehouse storage locations X, Y, and Z and outbound staging areas a-i. The warehouse storage location for an item may be known (i.e., whether the item is located in warehouse storage location X, Y, or Z), and the available outbound staging areas for that item may be those outbound staging areas previously identified as being available at box 530. As such, the computing system may identify one pull path for a product that is directed to each of the available outbound staging areas (box 556). For example, if the available outbound staging areas are b, c, e, and f, then the candidate pull paths for an item stored in warehouse storage location X may be X→b, X→c, X→e, and X→f.

At box 558, the computing system determines whether there are additional products to be loaded onto the inbound truck, for which the operations of boxes 552-556 are to be performed. Assuming that there is a second item to be loaded onto the truck and that is currently stored in warehouse storage location Y, the pull paths identified for that second item may be Y→b, Y→c, Y→e, and Y→f. The operations of boxes 552-556 may continue until one or more pull paths have been identified for each to-be-loaded product for the inbound truck.

At box 560, the computing system determines multiple available path combinations for products to be unloaded from the inbound truck and placed in storage, and for products to be pulled from storage and loaded onto the truck. The computing system does this by identifying multiple combinations that each include an unloading path, a put path, a pull path, and a loading path from the collections of paths that have been identified as being available in the previously-discussed operations.

At box 562, the computing system may determine a first path combination. An initial step may be to identify an unloading path (box 564) from the available subset of unloading paths identified through the operations of box 520. A next step may involve identifying, for each to-be-unloaded product, the put paths that are directed from (e.g., start from) the inbound storage area represented by the identified unloading path (box 566). A result of the operations of box 566 is that the computing system has identified all path combinations for all the to-be-unloaded products that start with a first unloading path and then branch out with various put paths to place the various to-be-unloaded products in various warehouse storage locations (some to-be-unloaded products having multiple potential warehouse storage locations).

At box 568, the computing system identifies an unloading path from the available subset of loading paths identified through the operations of box 530. A next step may involve identifying, for each to-be-loaded product, the put path between the current location in the warehouse at which the to-be-loaded product is stored and the outbound staging area represented by the identified loading path. A result of the operations of box 568 is that the computing system has identified all paths for all to-be-loaded products that start at current warehouse storage locations of the to-be-loaded products and funnel through the outbound staging area represented by the identified loading path.

At box 572, the computing system determines whether there are more path combinations to determine. For example, the operations of boxes 564 and 566 may iterate for each potential unloading path identified through the operations of box 520 (e.g., if there are two available unloading paths, the operations of boxes 564 and 566 may be performed twice to identify the various different path combinations that products can navigate from the inbound truck to potential warehouse storage locations). The operations of boxes 568 and 570 may iterate for each potential loading path identified through the operations of box 530 (e.g., if there are five available loading paths, the operations of boxes 568 and 570 may be performed five times to identify the various different path combinations that to-be-loaded products can navigate from their current warehouse storage locations to the inbound truck).

At box 574, the computing system determines a score for each available path combination. The score may reflect a preference for each respective path combination, and the computing system may generate the score based on a combination of the scores for the constituent paths that comprise the path combination.

At box 576, the computing system determines the score for a path combination, for example, a first path combination from among the various path combinations determined at box 560. The score for the path combination is generated by combining the scores for the component parts of the path combination. As an example, this score would involve a combination of a score for the constituent unloading path, a score for the constituent put path, a score for the constituent pull path, and a score for the constituent loading path that together comprise the path combination.

An example mechanism in which to combine such scores is illustrated in box 578. That mechanism shows that the total score for the path combination involves adding the score for (1) a constituent unloading path with the score for (2) a constituent loading path, and then adding to that combined score (3) a summation of scores for every put path divided by the number of put paths (e.g., divided by the number of products that would be put into storage) that link to the respective unloading path, and (4) a summation of the scores for every pull path divided by the number of pull paths (e.g., divided by the number or products that would be pulled from storage for loading on the truck) that link to the respective loading path. The scores may be combined in various other ways, for example, not dividing the summation of the scores for the put paths and instead multiplying the score for the unloading path by the number products put into storage (and performing similar calculations for the pull path and the loading path).

At box 580, the scores are weighted in different ways. In the example described above, the scores for the unloading path, the summation of put paths, the summation of pull paths, and the loading path may each constitute twenty-five percent of the value of the total score, but the scores may be weighted in different manners, for example, 40% weight for the unloading path, 10% weight for the put paths, 20% weight for the pull paths, and 30% weight for the loading paths. In other examples, the unloading and loading paths may be weighted equally but represent a different combined weight than a weight applied to the combination of the put paths and pull paths.

At box 582, the computing system repeats the operations of boxes 576-580 for each available path combination determined by the operations of box 560. As a result, the computing system may generate a score for each available path combination, where each score represents a preference or priority that a given path combination should receive.

The scores used for each available path combination may be scores that are predetermined and that are common to multiple different states of the warehouse (e.g., different occupancy states of the transport bays, inbound storage areas, and outbound staging areas). For example, the scores may be those calculated at box 502 for a number of paths without consideration as to whether the paths are assigned. In other words, a score assigned to a given path may remain the same as other paths are assigned to trucks. The likelihood that the given path may be chosen or otherwise assigned to an inbound truck, however, may increase as paths with more favorable scores become no longer available (e.g., because they are selected for a previously-inbound truck). In other examples, the scores may represent the priority a given path should receive for a specific state of the warehouse. In other words, the score that a given path receives may differ based on whether an adjacent or nearby path is available or not available. As such, the system may store a set of path scores for each potential state of the warehouse, or may re-compute the path scores each time the state of the warehouse changes.

At box 584, the computing system determines a selected path combination from among the multiple available path combinations, based on the selected combination having a most favorable score from among scores of the multiple available path combinations. For example, should the score for each path cover a dynamic/potential range of zero to one, with zero representing the most favorable score, the path combination with the score that is closest to zero may be selected as the most favorable path combination.

At box 586, the computing system outputs information that identifies all of the selected path combination or portions thereof. For example, at box 588, the computing system may output information that assigns a truck to a selected transport bay that is identified by the selected path combination (e.g., the transport bay from which the unloading path of the selected path combination is directed, and the same transport bay to which the loading path of the selected path combination is directed). This information may be output by a display device of the computing system, for example, a display device shown to a dock master of the warehouse, or may be transmitted to a display device that the driver of the inbound truck accesses to identify at which transport bay he or she is to dock the inbound truck.

At box 590, the computing system may output information that assigns the truck to an unloading path that comprises part of the selected path combination. This information may be output to the dock master to instruct forklift operators to unload items from the assigned transport bay and move those items to the inbound storage area that comprises part of the selected path combination (in this sense the output information not need to visually indicate the "path," but only the end points that comprise the path). The information may also or alternatively be output to display devices on the forklifts or devices carried by the forklift operators. In examples in which the forklifts are automated, information is transmitted to the automated forklifts or systems that control the forklifts to instruct the forklifts to unload items from the selected transport bay and move the unloaded items to the inbound storage area.

At box 592, the computing system may output information that assigns the truck to a loading path that comprises part of the selected path combination. This information may be output to the dock master to instruct forklift operators to move items from the selected outbound staging area to the assigned transport bay. The information may also or alternatively be output to display devices on the forklifts or devices carried by the forklift operators. In examples in which the forklifts are automated, information may transmitted to the automated forklifts or systems that control the forklifts to instruct the forklifts to transport items from the selected outbound staging area to the assigned transport bay.

At box 594, the computing system may transmit information that identifies the selected outbound staging area to an automated system that pulls products that are to be loaded onto the inbound truck and transports those products to the selected outbound staging area. This automated pulling process may begin immediately, so that as soon as forklifts have completed unloading the truck there are items waiting in the outbound staging area ready to be loaded onto the truck.

Although examples described above discuss path combinations that comprise four component path portions (i.e., an unloading path portion, a put path portion, a pull path portion, and a loading path portion), the technologies described herein may operate on systems with a different number of path portions. As one example described in various embodiments throughout this disclosure, the system may perform calculations using just the unloading path portion and the loading path portion (e.g., without taking into account put paths and pull paths). In other examples, the computing system may take into account just the path portions associated with storing items (e.g., just the unloading path portion and the put path portion), or may take into account just the path portions associated with loading items onto a truck (e.g., just the pull path portion and the loading path portion).

In some examples, the collective path that an item takes from a truck to a warehouse storage location comprises more than two path portions (e.g., more than an unloading path portion and a put path portion). For example, one path portion may be from the truck to the inbound storage area, a second path portion may be involve the conveyor belts that transport items from the inbound storage area to the redundant conveyor lanes 136 and 138, a third path portion may be from the redundant conveyor lanes 136 and 138 to the vertical lift device 108, and a fourth path portion may be from the vertical lift device 108 to one or more carts 110 on a given level of the racks.

In some examples, the warehouse storage location that is a destination of the inbound storage paths and an origination of the outbound loading paths is simply a room that may store hundreds or even thousands of pallets. The actual location at which an item is stored may be determined by a separate computing system that organizes items within each storage room. As such, each warehouse storage location may store more than one storage item. In other examples, each warehouse storage location may represent a location at which a single storage item (e.g., a single pallet) may be stored in the warehouse racks. In such an example, there may be hundreds or even thousands of available warehouse storage locations, in distinction to the example illustrated in FIG. 8, which shows three warehouse storage locations representing three large storage rooms. In the example in which each warehouse storage locations represents a location at which a single storage item may be stored, a different computing system may provide the computing system discussed herein with candidate storage location for an item, and the computing system discussed herein may perform the operations discussed herein to select one of those candidate storage locations.

In some examples, after a truck has been completely unloaded, the unloading path assigned to that truck may be unassigned (e.g., the inbound storage area assigned to the truck may be unassigned), so that a next inbound truck may use the inbound storage area that had been in use, and/or so that the computing system may assign to a next inbound truck unloading and/or loading paths that otherwise would have crossed the unloading path that had been in use.

In some examples, the technologies described herein are applied to warehouses or portions of a warehouse that do not include automated conveyor belts. In such systems, forklifts may transport physical items directly from a docked truck to their location in the warehouse racks. The computing system (or another computing system) may identify potential storage locations for each item to be unloaded from the truck, and the computing system may then identify numerous unloading paths from an available transport bay to the various potential locations for each item to be unloaded from the truck, to identify the least cost unloading paths for the given transport bay (and a total score of all of the unloading paths summed together). The computing system may perform this analysis for each of multiple available transport bay to identify a transport bay with the most favorable score.

Similar techniques may be applied to loading paths, with the physical items being moved directly from the storage racks to the docked truck, or being staged at a candidate outbound staging area (which would involve two path portions, one from warehouse storage in the racks to an outbound staging area, and another from the outbound staging area to the transport bay at which a truck is docked). In such examples, the computing system may select a transport bay (and an outbound staging area in the two-path-portion example) that is part of the most-favorably scored path combination.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 9:
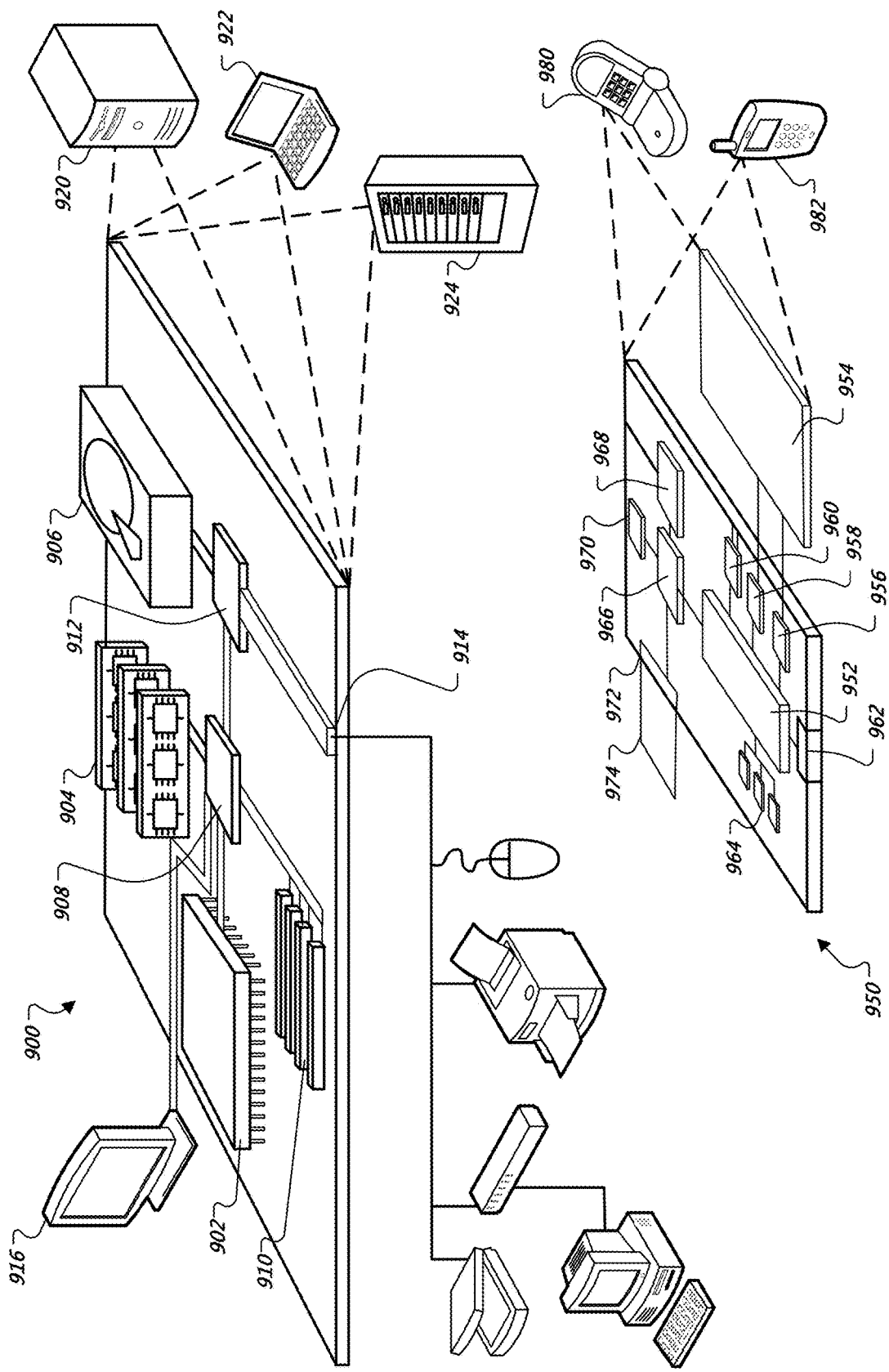
FIG. 9 is a block diagram of computing devices that may be used to implement the systems and methods described in this document, as either a client or as a server or plurality of servers.

FIG. 9 is a block diagram of computing devices 900, 950 that may be used to implement the systems and methods described in this document, as either a client or as a server or plurality of servers. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 900 includes a processor 902, memory 904, a storage device 906, a high-speed controller 908 connecting to memory 904 and high-speed expansion ports 910, and a low speed controller 912 connecting to low speed expansion port 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high-speed controller 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high-speed controller 908 manages bandwidth-intensive operations for the computing device 900, while the low speed controller 912 manages lower bandwidth-intensive operations. Such allocation of functions is an example only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Additionally computing device 900 or 950 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for routing items in a warehouse, comprising:
  receiving, by a computing system, a request to assign an inbound truck arriving at the warehouse to a transport bay from among multiple transport bays at the warehouse that are structured to dock trucks;
  accessing, by the computing system, information that identifies a collection of unloading paths in the warehouse, the unloading paths being directed from the multiple transport bays to multiple inbound storage areas in the warehouse, the multiple inbound storage areas being areas in the warehouse that are arranged to temporarily store physical items unloaded from trucks docked at various of the transport bays;
  determining, by the computing system, an available subset of unloading paths from among the collection of unloading paths, by removing from the collection of unloading paths:
    (i) any unloading path directed from a transport bay, of the multiple transport bays, that is currently occupied by a truck, and
    (ii) any path directed to an inbound storage area, of the multiple inbound storage areas, to which a truck at any of the multiple transport bays is assigned;
  accessing, by the computing system, information that identifies a collection of loading paths in the warehouse, the loading paths being directed from multiple outbound staging areas in the warehouse to the multiple transport bays, the multiple outbound staging areas being areas in the warehouse that are arranged to stage physical items that are to be loaded onto trucks docked at various of the transport bays;
  determining, by the computing system, an available subset of loading paths from among the collection of loading paths, by removing from the collection of loading paths:
    (i) any loading path directed to a transport bay, of the multiple transport bays, that is currently occupied by a truck, and
    (ii) any loading path directed from an outbound staging area, of the multiple outbound staging areas, to which a truck at any of the multiple transport bays is assigned;
  identifying, by the computing system, multiple available path combinations that each include an unloading path from the available subset of unloading paths and a loading path from the available subset of loading paths that each use a same transport bay;
  identifying, by the computing system, a score for each available path combination of the multiple available path combinations, based on a score for the unloading path of the respective available path combination and a score for the loading path of the respective available path combination;
  determining, by the computing system, a selected path combination from among the multiple available path combinations, based on the selected path combination having a most favorable score from among scores of the multiple available path combinations;
  outputting, by the computing system, assignment information that assigns the inbound truck to: (a) a selected transport bay used by the selected path combination, (b) an unloading path of the selected path combination that is directed from the selected transport bay to a selected inbound storage area, and (c) a selected loading path of the selected path combination that is directed from a selected outbound staging area to the selected transport bay;
  automatically operating, based on the assignment information, an automated conveyor system to transport physical items to at least one of the selected transport bay, along the unloading path of the selected path combination, or along the selected loading path of the selected path combination;
  automatically operating, based on the assignment information, an automated shuttling system to transfer physical items at the selected inbound storage area based in part on the unloading path of the selected path combination; and
  automatically operating, based on the assignment information, the automated shuttling system to transfer physical items at the selected outbound staging area based in part on the selected loading path of the selected path combination.

2. The computer-implemented method of claim 1, further comprising:
  identifying, by the computing system for each currently-docked truck of multiple trucks currently docked at a respective transport bay of the multiple transport bays, an unloading path assigned to the respective truck from among the collection of unloading paths and a loading path assigned to the respective truck from among the collection of unloading paths, and wherein:
  determining the available subset of unloading paths includes:
    (a) removing from the collection of unloading paths any unloading path that crosses an unloading path that is assigned to any currently-docked truck, and
    (b) removing from the collection of unloading paths any unloading path that crosses a loading path that is assigned to any currently-docked truck; and
  determining the available subset of loading paths includes:
    (a) removing from the collection of loading paths any loading path that crosses an unloading path that is assigned to any currently-docked truck, and
    (b) removing from the collection of loading paths any loading path that crosses a loading path that is assigned to any currently-docked truck.

3. The computer-implemented method of claim 1, further comprising:
  identifying, by the computing system, one or more transport bays of the multiple transport bays that have been designated as being out of service, and wherein:
  determining the available subset of unloading paths includes removing from the collection of unloading paths any unloading path that is directed from any of the one or more transport bays that have been designated as being out of service; and
  determining the available subset of loading paths includes removing from the collection of loading paths any loading path that is directed to any of the one or more transport bays that have been designated as being out of service.

4. The computer-implemented method of claim 1, further comprising:
generating, by the computing system, a score for each unloading path in the collection of unloading paths, based on a physical distance or time length of the respective unloading path; and
generating, by the computing system, a score for each loading path in the collection of loading paths, based on a physical distance or time length of the respective loading path.

5. The computer-implemented method of claim 4, wherein the computing system generates the score for each unloading path in the collection of unloading paths and generates the score for each loading path in the collection of loading paths before the computing system receives the request to assign the inbound truck arriving at the warehouse to a transport bay.

6. The computer-implemented method of claim 1, wherein identifying the score for each available path combination of the multiple available path combinations includes weighting the score for the unloading path of the respective path combination differently than the score for the loading path of the respective path combination.

7. The computer-implemented method of claim 1, further comprising:
identifying, by the computing system, multiple to-be-unloaded physical items that are to be unloaded from the inbound truck; and
determining, by the computing system, a collection of candidate put paths by identifying, for each combination of a to-be-unloaded physical item of the multiple to-be-unloaded physical items and each inbound storage area to which an unloading path in the available subset of unloading paths is directed, a put path that is directed from the respective inbound storage area to a location at which the respective to-be-unloaded physical item is to be stored in the warehouse, wherein:
identifying the multiple available path combinations includes identifying path combinations that each include (a) an unloading path from the available subset of unloading paths, (b) a put path from the collection of candidate put paths, the respective put path being from the inbound storage area of the respective unloading path, and (c) a loading path from the available subset of loading paths, the respective loading path identifying a same transport bay as the respective unloading path; and
identifying the score for each available path combination of the multiple path combinations is based on (a) the score for the unloading path of the respective path combination, (b) a score for the put path of the respective path combination, and (c) the score for the loading path of the respective path combination.

8. The computer-implemented method of claim 7, further comprising:
identifying, by the computing system, multiple to-be-loaded physical items that are to be loaded onto the inbound truck; and
determining, by the computing system, a collection of candidate pull paths by identifying, for each combination of a to-be-loaded physical item of the multiple to-be-loaded physical items and each outbound staging area from which a loading path in the available subset of loading paths is directed, a pull path from a storage location in the warehouse for the respective to-be-loaded physical item to an outbound staging area for the respective loading path, wherein:
identifying the multiple available path combinations includes identifying path combinations that each include (a) an unloading path from the available subset of unloading paths, (b) a put path from the collection of candidate put paths, the respective put path being from the inbound storage area of the respective unloading path, (c) a pull path from the collection of candidate pull paths, the pull path being directed to the outbound staging area of a loading path, and (d) the respective loading path from the available subset of loading paths, the respective loading path identifying a same transport bay as the respective unloading path; and
identifying the score for each available path combination of the multiple path combinations is based on (a) the score for the unloading path of the respective path combination, (b) the score for the put path of the respective path combination, (c) the score for the pull path of the respective path combination, and (d) the score for the loading path of the respective path combination.

9. The computer-implemented method of claim 7, wherein:
the collection of candidate put paths includes multiple put paths for a first to-be-unloaded physical item of the multiple to-be-unloaded physical items that is directed from a first inbound storage area to storage, including a first put path from the first inbound storage area to a first storage location and a second put path from the first inbound storage area to a second storage location, the first put path having a different score than the second put path;
the multiple available path combinations includes:
a first path combination including (a) an unloading path from a first transport bay to the first inbound storage area, (b) the first put path from the first inbound storage area to the first storage location, (c) a pull path from the first storage location to a first outbound staging area, and (d) a loading path from the first outbound staging area to the first transport bay, and
a second path combination including (a) the unloading path from the first transport bay to the first inbound storage area, (b) the second put path from the first inbound storage area to the second storage location, (c) a pull path from the second storage location to the first outbound staging area, and (d) the loading path from the first outbound staging area to the first transport bay; and
the selected path combination is the first path combination.

10. The computer-implemented method of claim 9, wherein the first put path has a more favorable score than the second put path based on a physical distance or time length of the first put path being less than a physical distance or time length of the second put path.

11. The computer-implemented method of claim 9, wherein the first put path has a more favorable score than the second put path despite a physical distance or time length of the first put path being greater than a physical distance or time length of the second put path, based on the first storage location having a more favorable temperature for storage of the first physical item than a temperature of the second storage location.

12. The computer-implemented method of claim 1, wherein the automated conveyor system includes first conveyor modules located at the selected inbound storage area and the selected outbound staging area, and second conveyor modules configured to transport physical items from the selected inbound storage area to the automated shuttling system and transport physical items from the automated shuttling system to the selected outbound staging area.

13. The computer-implemented method of claim 1, wherein the automated shuttling system includes a vertical lift configured to move physical items from or to different rows of racks.

14. The computer-implemented method of claim 1, wherein the automated shuttling system includes carts positioned at different rows of racks, each cart being configured to carry physical items between a vertical lift and a storage location in the racks.

15. The computer-implemented method of claim 1, further comprising:
   enabling, based on the assignment information, forklifts to transport physical items from the selected transport bay to the selected inbound storage area along the unloading path of the selected path combination; and
   enabling, based on the assignment information, the forklifts to transport physical items from the selected outbound staging area to the selected transport bay along the selected loading path of the selected path combination.

16. The computer-implemented method of claim 15, wherein the forklifts include automated forklifts.

17. The computer-implemented method of claim 1, wherein the inbound storage area includes a least part of the automated conveyor system or the automated shuttling system.

18. The computer-implemented method of claim 17, wherein the outbound staging area includes at least part of the automated conveyor system or the automated shuttling system.

19. A warehouse system, comprising:
   multiple transport bays at a warehouse that are structured to dock trucks;
   multiple inbound storage areas in the warehouse that are arranged to temporarily store physical items unloaded from trucks docked at various of the transport bays;
   multiple outbound staging areas being areas in the warehouse that are arranged to stage physical items that are to be loaded onto trucks docked at various of the transport bays;
   a computing system that includes one or more processors and one or more non-transitory computer-readable devices including instructions that, when executed by the one or more processors, cause the computing system to perform operations that comprise:
      receiving, by the computing system, a request to assign an inbound truck arriving at the warehouse to a transport bay from among the multiple transport bays;
      accessing, by the computing system, information that identifies a collection of unloading paths in the warehouse, the unloading paths being directed from the multiple transport bays to the multiple inbound storage areas in the warehouse;
      determining, by the computing system, an available subset of unloading paths from among the collection of unloading paths, by removing from the collection of unloading paths:
         (i) any unloading path directed from a transport bay, of the multiple transport bays, that is currently occupied by a truck, and
         (ii) any path directed to an inbound storage area, of the multiple inbound storage areas, to which a truck at any of the multiple transport bays is assigned;
      accessing, by the computing system, information that identifies a collection of loading paths in the warehouse, the loading paths being directed from multiple outbound staging areas in the warehouse to the multiple transport bays, the multiple outbound staging areas being areas in the warehouse that are arranged to stage physical items that are to be loaded onto trucks docked at the transport bays;
      determining, by the computing system, an available subset of loading paths from among the collection of loading paths, by removing from the collection of loading paths:
         (i) any loading path directed to a transport bay, of the multiple transport bays, that is currently occupied by a truck, and
         (ii) any loading path directed from an outbound staging area, of the multiple outbound staging areas, to which a truck at any of the multiple transport bays is assigned;
      identifying, by the computing system, multiple available path combinations that each include an unloading path from the available subset of unloading paths and a loading path from the available subset of loading paths that each use a same transport bay;
      identifying, by the computing system, a score for each available path combination of the multiple available path combinations, based on a score for the unloading path of the respective available path combination and a score for the loading path of the respective available path combination;
      determining, by the computing system, a selected path combination from among the multiple available path combinations, based on the selected path combination having a most favorable score from among scores of the multiple available path combinations;
      outputting, by the computing system, assignment information that assigns the inbound truck to: (a) a selected transport bay used by the selected path combination, (b) an unloading path of the selected path combination that is directed from the selected transport bay to a selected inbound storage area, and (c) a selected loading path of the selected path combination that is directed from a selected outbound staging area to the selected transport bay;
      automatically operating, based on the assignment information, an automated conveyor system to transport physical items to at least one of the selected transport bay, along the unloading path of the selected path combination, or along the selected loading path of the selected path combination;
      automatically operating, based on the assignment information, an automated shuttling system to transfer physical items at the selected inbound storage area based in part on the unloading path of the selected path combination;
      automatically operating, based on the assignment information, the automated shuttling system to transfer physical items at the selected outbound staging area based in part on the selected loading path of the selected path combination.

* * * * *